(12) United States Patent
Otsuka et al.

(10) Patent No.: US 11,998,967 B2
(45) Date of Patent: Jun. 4, 2024

(54) PANEL-SHAPED FORMED PRODUCT

(71) Applicant: NIPPON STEEL CORPORATION, Tokyo (JP)

(72) Inventors: Kenichiro Otsuka, Aichi (JP); Yoshiaki Nakazawa, Hyogo (JP); Naruhiko Nomura, Hyogo (JP); Toshiya Suzuki, Hyogo (JP); Masahiro Kubo, Osaka (JP)

(73) Assignee: NIPPON STEEL CORPORATION, Tokyo (JP)

( * ) Notice: Subject to any disclaimer, the term of this patent is extended or adjusted under 35 U.S.C. 154(b) by 522 days.

(21) Appl. No.: 17/209,473

(22) Filed: Mar. 23, 2021

(65) Prior Publication Data

US 2021/0205871 A1 Jul. 8, 2021

Related U.S. Application Data

(62) Division of application No. 15/537,955, filed as application No. PCT/JP2015/006394 on Dec. 22, 2015, now Pat. No. 11,000,890.

(30) Foreign Application Priority Data

Dec. 25, 2014 (JP) .................. 2014-263665
Dec. 25, 2014 (JP) .................. 2014-263666
Jun. 15, 2015 (JP) .................. 2015-120036

(51) Int. Cl.
*B60J 5/04* (2006.01)
*B21D 22/02* (2006.01)
(Continued)

(52) U.S. Cl.
CPC ........... *B21D 22/022* (2013.01); *B21D 22/22* (2013.01); *B21D 22/26* (2013.01); *B21D 53/88* (2013.01);
(Continued)

(58) Field of Classification Search
None
See application file for complete search history.

(56) References Cited

U.S. PATENT DOCUMENTS 2,791,464 A * 5/1957 Renno ................... B60J 5/0413
49/350
6,328,359 B1 * 12/2001 Pacella .................. B60J 5/0447
293/128
(Continued)

FOREIGN PATENT DOCUMENTS

CN 102430628 A * 2/2012
CN 202516923 11/2012
(Continued)

OTHER PUBLICATIONS

Use of "Super-High-Tensile-Strength Steel" Increased to 25%, Nissan Motor Co., Ltd., Mar. 12, 2013.
(Continued)

*Primary Examiner* — Joseph D. Pape
(74) *Attorney, Agent, or Firm* — Clark & Brody LP

(57) ABSTRACT

A panel-shaped formed product made of a metal sheet includes a top panel portion, an opening portion, and a vertical wall portion. The top panel portion is polygonal. The opening portion is provided in the top panel portion. The vertical wall portion extends from at least not less than two adjacent borders among the borders of the top panel portion. At least one pair of each vertical wall portion of pairs of adjacent vertical wall portions of the vertical wall portions has a stepped portion. As a result, the panel shaped formed product has fewer defects such as cracks and wrinkles even when it has a shape that is difficult to form.

9 Claims, 27 Drawing Sheets

(51) Int. Cl.
  *B21D 22/22*  (2006.01)
  *B21D 22/26*  (2006.01)
  *B21D 53/88*  (2006.01)
  *B21D 22/06*  (2006.01)
(52) U.S. Cl.
  CPC ............... *B60J 5/04* (2013.01); *B60J 5/0413* (2013.01); *B21D 22/06* (2013.01)

(56) References Cited

U.S. PATENT DOCUMENTS

| | | | |
|---|---|---|---|
| 6,830,419 | B1 | 12/2004 | Turner |
| 7,040,688 | B2 * | 5/2006 | White ................... B60J 5/0463 49/502 |
| 7,537,267 | B2 | 5/2009 | Tanaka et al. |
| 2002/0148272 | A1 | 10/2002 | Jroski |
| 2004/0012226 | A1 | 1/2004 | Morrison et al. |
| 2012/0266644 | A1 | 10/2012 | Blei |
| 2013/0199679 | A1 | 8/2013 | Toji et al. |
| 2015/0209840 | A1 | 7/2015 | Koyer |
| 2015/0231688 | A1 | 8/2015 | Yamagata |
| 2016/0222485 | A1 | 8/2016 | Murakami |
| 2017/0225215 | A1 | 8/2017 | Nakagaito |

FOREIGN PATENT DOCUMENTS

| | | |
|---|---|---|
| JP | 61-97323 | 6/1986 |
| JP | 6197323 | 6/1988 |
| JP | 63-168232 | 7/1988 |
| JP | 2-93021 | 7/1990 |
| JP | 05-058158 | 3/1993 |
| JP | 06-14890 | 4/1994 |
| JP | 8-10861 | 1/1996 |
| JP | 8-58382 | 3/1996 |
| JP | 2789945 | 8/1998 |
| JP | 2001-038426 | 2/2001 |
| JP | 2003-048430 | 2/2003 |
| JP | 2006-306157 | 11/2006 |
| JP | 2007-223412 | 9/2007 |
| JP | 2007-296953 | 11/2007 |
| JP | 2008-056025 | 3/2008 |
| JP | 2008-056114 | 3/2008 |
| JP | 2008-094353 | 4/2008 |
| JP | 2002-331317 | 10/2008 |
| JP | 2008-242787 | 10/2008 |
| JP | 2009-090936 | 4/2009 |
| JP | 2009-274590 | 11/2009 |
| JP | 2010-047965 | 3/2010 |
| JP | 2010-100097 | 5/2010 |
| JP | 2010-527407 | 8/2010 |
| JP | 2010-208433 | 9/2010 |
| JP | 2011-050971 | 3/2011 |
| JP | 2011-147970 | 8/2011 |
| JP | 2012-140058 | 7/2012 |
| JP | 2012-153209 | 8/2012 |
| JP | 2013-000780 | 1/2013 |
| JP | 5151784 | 2/2013 |
| JP | 2013-112133 | 6/2013 |
| JP | 2013-173481 | 9/2013 |
| JP | 2013-189173 | 9/2013 |
| JP | 2014-008943 | 1/2014 |
| JP | 2014-065411 | 4/2014 |
| JP | 2014-144737 | 8/2014 |
| KR | 10-2011-0053474 | 5/2011 |
| KR | 10-2011-0081706 | 7/2011 |
| KR | 10-2014-0044676 | 4/2014 |
| KR | 20140086380 A * | 7/2014 |
| TW | 201422330 | 6/2014 |
| WO | WO 81/03467 * | 12/1981 |

OTHER PUBLICATIONS

Research an Application on Key Process Experiment of High Strength Steel for Hot Forming, Dalian University of Technology, 2013.

Han, Application of hot stamping process by integrating quenching & partitioning heat treatment to improve mechanical properties, (Year: 2014).

* cited by examiner

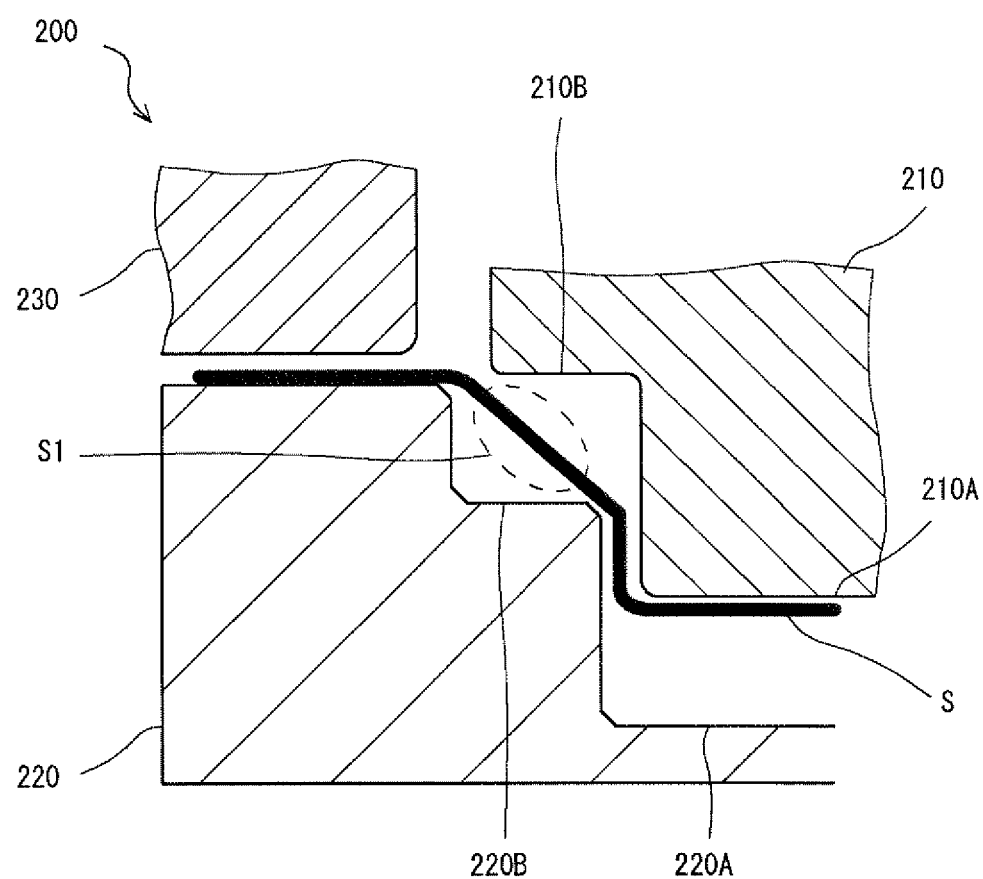

Sheet Thickness Reduction Rate %

Curvature (1/m)

Sheet Thickness
Reduction Rate %

Curvature (1/m)

Sheet Thickness
Reduction Rate %

Curvature (1/m)

PANEL-SHAPED FORMED PRODUCT

This application is a Divisional of U.S. Ser. No. 15/537,955 filed on Jun. 20, 2017, which is a national phase of PCT/JP2015/006394 filed on Dec. 22, 2015.

TECHNICAL FIELD

The present invention relates to a panel-shaped formed product and a method for producing a panel-shaped formed product. More specifically, the present invention relates to a panel-shaped formed product suitable for an automobile door inner panel, and a method for producing the same.

BACKGROUND ART

A door of an automobile is produced by mainly combining a door inner panel and a door outer panel. The door of an automobile is attached with a window glass, a window driving device, an acoustic speaker, a handle, and the like. To accommodate these, a space is required between the door inner panel and the door outer panel. For that reason, for example, a vertical wall portion is provided on the door inner panel. Also, when the door of the automobile is closed, the vehicle interior needs to be sealed by the door. For that reason, for example, a step portion is provided in the vertical wall portion of the door inner panel. As a result of the step portion of the vertical wall portion facing a pillar of a vehicle body or the like, the tightness of the vehicle interior is ensured.

A door inner panel used for a side door of an automobile or the like is formed by subjecting a metal sheet such as a steel sheet to press working. In general, since the shape of the door inner panel is complicated, the metal sheet may be allowed to significantly deform. In such a case, cracks, wrinkles or the like may occur in the formed door inner panel. Therefore, a metal sheet with high workability is used for the starting material of the door inner panel. Since the metal sheet with high workability has low strength, the door inner panel has low strength as well. Accordingly, it is often the case that the door inner panel is attached with a reinforcing member (for example, a beltline reinforcement, a door impact beam, or the like).

A structure of a door inner panel is disclosed in Japanese Patent Application Publication No. 2007-296953 (Patent Literature 1), Japanese Patent Application Publication No. 2008-94353 (Patent Literature 2), and Japanese Patent Application Publication No. 2013-112133 (Patent Literature 3). A method for producing a door inner panel is disclosed in Japanese Patent Application Publication No. 2013-189173 (Patent Literature 4), Japanese Patent Application Publication No. 2001-38426 (Patent Literature 5), Japanese Patent Application Publication No. 2011-147970 (Patent Literature 6), and Japanese Patent Application Publication No. 2011-50971 (Patent Literature 7).

A door inner panel disclosed in Patent Literature 1 includes a beltline reinforcement. The beltline reinforcement is joined along a vehicle body fore-and-aft direction in a beltline portion of the door inner panel. Patent Literature 1 describes that such configuration allows the beltline reinforcement to bear a collision load in the vehicle body fore-and-aft direction, thereby effectively reducing the bending moment acting on the beltline portion.

In a door inner panel disclosed in Patent Literature 2, when a collision load is applied from a side face of the vehicle body, the door inner panel and a beltline reinforcement are brought into contact with each other, and a load absorbing portion of the door inner panel is deformed. Patent Literature 2 describes that as a result of such arrangement, the load absorbing portion absorbs part of the load applied in a thickness direction of the door inner panel so that the rigidity of the door inner panel is ensured.

In a side door disclosed in Patent Literature 3, it is configured such that a rear end portion and a fore end portion of a beltline reinforcement formed by hot stamping have a lower strength and a lower rigidity than those of the main body portion. As a result, when a collision load is applied from the front face of the vehicle body, the rear end portion of the beltline reinforcement is plastically deformed, thereby increasing the contact area with a center pillar. Patent Literature 3 describes that such deformation of the rear end portion of the beltline reinforcement can absorb the energy of collision.

In a method for producing a door inner panel disclosed in Patent Literature 4, a first formed body having a vertical wall portion and a second formed body are welded together, and the welded formed body is processed by hot pressing or rolling. Patent Literature 4 describes that such arrangement makes it possible to provide a longer-length structural component for a vehicle body, which has excellent load bearing performance per unit weight thereof.

In a method for producing a door inner panel disclosed in Patent Literature 5, a wrinkle pressing force during press working of a high-strength steel sheet is specified. A relationship between a curvature of wall warping generated during forming and a wrinkle pressing force is obtained in advance. On the basis of this relationship, a wrinkle pressing force is applied such that the curvature of wall waring is reduced. Patent Literature 5 describes that such arrangement makes it possible to form a trapezoidal member of high-strength steel sheet with high dimensional accuracy.

In a method for producing a door inner panel disclosed in Patent Literature 6, a die and a holder of a hot press forming apparatus are operated together to press-work a sheet to be processed. This makes it possible to prevent breakage of the sheet to be processed and occurrence of wrinkles thereof during forming. Further, Patent Literature 6 describes that such arrangement can ensure dimensional accuracy of the formed product after forming.

In a method for producing a door inner panel disclosed in Patent Literature 7, in hot press forming, a spacing between a die and a holder is controlled during processing of a formed product. Patent Literature 7 describes that such arrangement makes it possible to suppress wrinkles of a formed product.

CITATION LIST

Patent Literature

Patent Literature 1: Japanese Patent Application Publication No. 2007-296953
Patent Literature 2: Japanese Patent Application Publication No. 2008-94353
Patent Literature 3: Japanese Patent Application Publication No. 2013-112133
Patent Literature 4: Japanese Patent Application Publication No. 2013-189173
Patent Literature 5: Japanese Patent Application Publication No. 2001-38426
Patent Literature 6: Japanese Patent Application Publication No. 2011-147970

Patent Literature 7: Japanese Patent Application Publication No. 2011-50971

SUMMARY OF INVENTION

Technical Problem

However, in the door inner panels of Patent Literatures 1, 2, and 3, a separate reinforcing member such as a beltline reinforcement is indispensable in order to secure collision characteristics. For this reason, a door produced from the door inner panels of Patent Literatures 1, 2, and 3 has a low manufacturing efficiency and a high cost. Moreover, the steel sheet used for forming the door inner panel is a low-strength soft steel sheet. Therefore, cracks, wrinkles, or the like are less likely occur in the formed door inner panel. However, when the door inner panel has adjacent vertical wall portions, and the vertical wall portion has a step portion, it is likely that cracks, wrinkles or the like occur.

In the production methods of Patent Literatures 4 to 7, when each vertical wall portion extending from a border of a top panel portion of the formed door inner panel is adjacent to each other, cracks, wrinkles, and the like may occur.

An object of the present invention is to provide a high-strength panel-shaped formed product which has fewer defects such as cracks and wrinkles even if it has a shape of a high degree of forming difficulty. Further, another object of the present invention is to provide a method for producing a high-strength panel-shaped formed product which has fewer defects such as cracks and wrinkles even if it is formed into a shape of a high degree of forming difficulty.

Solution to Problem

A panel-shaped formed product made of a metal sheet according to an embodiment of the present invention includes a top panel portion, an opening portion, and a vertical wall portion. The top panel portion is polygonal. The opening portion is provided in the top panel portion. The vertical wall portion extends from at least not less than two adjacent borders among borders of the top panel portion. At least one pair of each vertical wall portion of pairs of adjacent vertical wall portions among the vertical wall portions has a step portion.

A method for producing a panel-shaped formed product according to an embodiment of the present invention is applied to production of a panel-shaped formed product having a top panel portion, a vertical wall portion, and a step portion. The top panel portion is polygonal. The vertical wall portion extends from at least not less than two adjacent borders among borders of the top panel portion. And, a step portion is provided in at least one pair of each vertical wall portion of pairs of adjacent vertical wall portions among the vertical wall portions.

The production method includes a preparation step, a heating step, and a press forming step. In the preparation step, a blank material made of a metal sheet is prepared. In the heating step, the blank material is heated. In the press forming step, the heated blank material is subjected to press working by hot stamping to form the blank material into a panel-shaped formed product The press forming step uses a press working apparatus including a die, a first punch, a second punch, and a blank holder. The die includes a form engraved portion in which the shape of the panel-shaped formed product is shaped. The first punch has a front end surface which faces the die and in which the shape of the top panel portion is shaped. The second punch is adjacent to the outside of the first punch and has a front end surface which faces the die and in which the shape of the step portion is shaped. The blank holder is adjacent to at least a portion of the outside of the second punch, and faces the die. The blank material is disposed between the die, and the blank holder, the first punch, and the second punch. The blank holder, the first punch, and the second punch move relative to the die, and the first punch and the second punch are pushed in on the blank material to form a panel-shaped formed product.

Advantageous Effects of Invention

A panel-shaped formed product according to the present invention has a high strength and fewer defects such as cracks and wrinkles. A method for producing a panel-shaped formed product according to the present invention enables production of a panel-shaped formed product having a shape of a high degree of forming difficulty while suppressing defects such as cracks and wrinkles.

BRIEF DESCRIPTION OF DRAWINGS

FIG. 10 is a cross-sectional view showing a state during press working by a general hot stamping apparatus.

DESCRIPTION OF EMBODIMENTS

Figure 1:
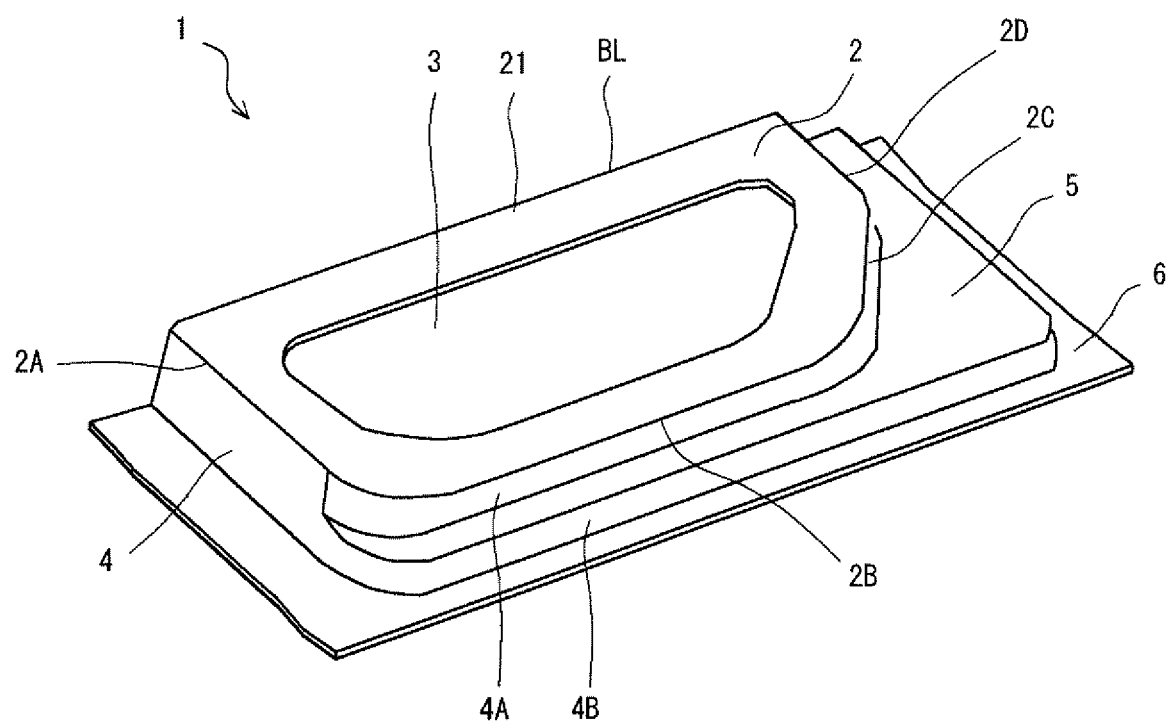
FIG. 1 is a perspective view of a door inner panel according to a first embodiment.

A panel-shaped formed product made of a metal sheet according to an embodiment of the present invention includes a top panel portion, an opening portion, and a vertical wall portion. The top panel portion is polygonal. The opening portion is provided in the top panel portion. The vertical wall portion extends from at least not less than two adjacent borders among borders of the top panel portion. At least one pair of each vertical wall portion of pairs of adjacent vertical wall portions among the vertical wall portions has a step portion.

The panel-shaped formed product of the present embodiment includes vertical wall portions which are adjacent to each other and have a step portion. As a result, the panel-shaped formed product of the present embodiment can enhance the tightness of vehicle interior.

Preferably, the panel-shaped formed product has a tensile strength of not less than 1200 MPa.

Applying such a panel-shaped formed product to a door inner panel for an automobile will result in improvement of collision characteristic thereof.

Preferably, the panel-shaped formed product is a door inner panel for an automobile, which has no vertical wall portion on a border on the vehicle upper side among borders of the top panel portion. Thus, the door inner panel can be combined with the door outer panel to form a side door for an automobile. A side window glass and others are accommodated between the door outer panel and the door inner panel Preferably, the opening portion is provided so as to leave a peripheral edge portion of the top panel portion. As a result, an edge portion on the vehicle upper side including the border on the vehicle upper side out of the peripheral edge portion of the top panel portion forms a beltline portion of the door inner panel.

Preferably, an edge portion on the vehicle upper side including a border on the vehicle upper side of the top panel portion is provided with at least one of a recessed portion and a protruded portion along the edge portion on the vehicle upper side. In this case, the upper edge on the vehicle upper side of the top panel portion (beltline portion) is responsible for the role of a beltline reinforcement that reinforces the top panel portion. In other words, the door inner panel and the beltline reinforcement are integrated. As a result, it is possible to reduce the weight and the production cost of the door inner panel.

Preferably, the top panel portion of the panel-shaped formed product has a boundary portion for dividing the opening portion into a plurality of portions. In the boundary portion, at least one of a recessed portion and a protruded portion is provided along the boundary portion. In this case, the boundary portion of the top panel portion plays a role of a door impact beam that reinforces the top panel portion. In other words, the door inner panel and the door impact beam are integrated. As a result, it is possible to reduce the weight and the production cost of the door inner panel.

Preferably, the metal sheet is a steel sheet. In this case, the panel-shaped formed product, which can be formed by hot stamping, has a high strength and fewer defects such as cracks and wrinkles.

In the case of a door inner panel, the sheet thickness of a region of a lower-side vertical wall portion including a border on the lower side of the top panel portion is larger than the sheet thickness of a region adjacent to that region. The lower-side vertical wall portion having a large sheet thickness will improve collision characteristic.

In the case of the door inner panel described above, preferably, the sheet thickness of a region of a front-side vertical wall portion including a border on the front side of the top panel portion is larger than the sheet thickness of a region adjacent to that region. The front-side vertical wall portion corresponds to an attaching portion of a hinge to be connected to the pillar. The front-side vertical wall portion having a large sheet thickness sufficiently ensures the strength of the hinge attaching portion.

In the case of the door inner panel described above, preferably, the sheet thickness of a region of an edge portion on the vehicle upper side including a border on the vehicle upper side of the top panel portion is larger than the sheet thickness of a region adjacent to that region. The edge portion on the vehicle upper side including the border on the vehicle upper side out of the peripheral edge portion of the top panel portion forms a beltline portion of the door inner panel. The edge portion on the vehicle upper side having a large sheet thickness improves collision characteristics.

In the case of the door inner panel described above, preferably, the top panel portion has a boundary portion which divides the opening portion into a plurality of portions, and the sheet thickness of a region of the boundary portion is larger than the sheet thickness of a region adjacent to that region. The boundary portion having a large sheet thickness improves collision characteristics.

A reinforcing member such as a beltline reinforcement or a door impact beam may be added to the door inner panel described above. When these reinforcing members are added, the reinforcing members may be attached so as to be superposed on the above-described recessed portion or convex portion, etc. or may be attached to another area. In that case, even when a material having a lower cost than that of a conventional reinforcing material, such as a thin sheet material and a low-strength material is used, it is possible to satisfy various characteristics. Further, it is also possible to simplify the shape of the reinforcing member to be attached additionally. For that reason, even when the reinforcing member is added, it is possible to suppress the production cost.

A method for producing a panel-shaped formed product according to an embodiment of the present invention is applied to production of a panel-shaped formed product including a top panel portion, a vertical wall portion, and a step portion. The top panel portion is polygonal. The vertical wall portion extends from at least not less than two adjacent borders among borders of the top panel portion. And a step portion is provided in at least one pair of each vertical wall portion of pairs of adjacent vertical wall portions among the vertical wall portions.

The production method includes a preparation step, a heating step, and a press forming step. In the preparation step, a blank material made of a metal sheet is prepared. In the heating step, the blank material is heated. In the press forming step, the heated blank material is subjected to press working by hot stamping, thereby forming the blank material into a panel-shaped formed product.

In the press forming step, a press working apparatus including a die, a first punch, a second punch, and a blank holder is used. The die has a die engraved portion in which the shape of the panel-shaped formed product is shaped. The first punch has a front end surface which faces the die and in which the shape of the top panel portion is shaped. The second punch is adjacent to the outside of the first punch and has a front end surface which faces the die and in which the shape of the step portion is shaped. The blank holder is located adjacent to at least a portion of the outside of the second punch and faces the die. The blank material is disposed between the die, and the blank holder, the first punch, and the second punch. The blank holder, the first punch, and the second punch move relative to the die, and the first punch and the second punch are pushed in on the blank material to form a panel-shaped formed product.

The method for producing a panel-shaped formed product of the present embodiment enables production of a panel-shaped formed product having a shape of a high degree of forming difficulty, while suppressing defects such as cracks and wrinkles. The shape of a high degree of forming difficulty includes, for example, one in which adjacent vertical wall portions of the panel-shaped formed product have a step portion.

Preferably, the blank material has an opening portion at a position corresponding to a top panel portion of the panel-shaped formed product.

As a result of that, the top panel portion is formed through stretch flange forming. Thus, it is possible to suppress cracks, wrinkles, etc. of the panel-shaped formed product.

Preferably, in the press forming step, pushing in on the blank material by the second punch is completed prior to pushing in on the blank material by the first punch.

In this case, in the press forming step, the pushing in on the blank material by the first punch may be started when the pushing in on the blank material by the second punch is completed or after the pushing in is completed. Moreover, in the press forming step, the pushing in on the blank material by the first punch may be started before the pushing in on the blank material by the second punch is completed.

As a result, the second punch together with the die holds down the blank material prior to the first punch. As a result, it is possible to further suppress cracks, wrinkles, etc. of the panel-shaped formed product. Holding down the blank material means that the blank material is completely clamped by the punch and the die so as not to be pushed in further. Further, completion of pushing in on the blank material by each individual punch means that the blank material becomes held down.

Preferably, the tensile strength of the panel-shaped formed product after forming is not less than 1200 MPa.

Applying such a panel-shaped formed product to a door inner panel for an automobile allows improvement in collision characteristics.

Preferably, the die engraved portion of the die used in the press forming step satisfies the following conditions: $d2 \geq 40$ mm, and $d1/d2 < 0.8$, where $d1$ is a depth from a reference surface facing the blank holder to a step surface facing the second punch, and $d2$ is a depth from the reference surface to a die bottom surface facing the first punch.

In this case, applying the panel-shaped formed product to a door inner panel for an automobile allows to obtain a sufficient amount of space for accommodating the window glass and others. It is also possible to improve the tightness of vehicle interior.

The metal sheet described above is preferably a steel sheet. In this case, the strength of the formed panel-shaped formed product is increased by quenching through hot stamping. The steel sheet may be a tailored blank. This makes it possible to enhance strength only in a necessary place, and also to reduce the sheet thickness.

Hereinafter, embodiments of the present invention will be described in detail with reference to the drawings. The same or corresponding parts are denoted by the same reference symbols, and description thereof will not be repeated. In the present embodiments, a case of a door inner panel for a vehicle, in which a panel-shaped formed product is made of steel sheet, will be described as an example.

First Embodiment

FIG. 1 is a perspective view of a door inner panel of a first embodiment. Referring to FIG. 1, a door inner panel 1 includes: a top panel portion 2; an opening portion 3; a vertical wall portion 4, a step portion 5, and a flange portion 6. The planar shape of the top panel portion 2 is polygonal. The polygon may be, for example, a quadrangle or a pentagon. A corner part of a polygon may have a round shape. FIG. 1 shows an exemplary case in which the planar shape of the top panel portion 2 is a pentagon. In the door inner panel 1, a border on the vehicle upper side of the top panel portion 2 forms a beltline BL. In the present embodiment, a case in which the sheet thickness of the steel sheet is constant will be described. Therefore, the sheet thickness of the door inner panel 1 is also constant over the entire area. In a strict sense, however, a slight increase or decrease of the sheet thickness will be caused by press forming.

The vertical wall portion 4 extends from at least not less than two adjacent borders among borders of the top panel portion 2. FIG. 1 shows an exemplary case in which the vertical wall portion 4 extends from four borders 2A, 2B, 2C, and 2D excluding the border (beltline BL) on the vehicle upper side among five borders of the pentagonal top panel portion 2. However, the number of borders of the top panel portion 2 from which the vertical wall portion 4 extends is not limited to four. The vertical wall portion 4 may extend from each of two or more adjacent borders of the top panel portion 2. When the vertical wall portion 4 extends from each border of the two or more adjacent borders of the top panel portion 2, each vertical wall portion extending from each border will be adjacent to each other. FIG. 1 shows an exemplary case in which the vertical wall portion 4 extends perpendicular to the top panel portion 2. However, the vertical wall portion 4 may not be strictly perpendicular to the top panel portion 2. The top panel portion 2 is protruded from the flange portion 6 by the vertical wall portion 4, thereby forming a space for accommodating a window glass and others.

The step portion 5 extends outward from a vertical wall portion 4A connected to the top panel portion 2. An outer edge of the step portion 5 is connected to a vertical wall portion 4B connected to the flange portion 6. FIG. 1 shows an exemplary case in which the surface of the step portion 5 is parallel with the top panel portion 2. However, the surface of the step portion 5 may not be strictly parallel with the top panel portion 2. FIG. 1 shows an exemplary case in which three adjacent vertical wall portions 4 have a step portion 5. In other words, a case in which there are two pairs of adjacent vertical wall portions 4, and the two pairs each have the step portion 5. However, the number of pairs of the vertical wall portions 4 having the step portion 5 is not limited to two. At least one pair among pairs of adjacent vertical wall portions 4 may have a step portion 5. FIG. 1 shows an exemplary case in which one step of step portion 5 is provided in the vertical wall portion 4. However, the number of steps of the step portion 5 is not limited to one, but may be plural.

The top panel portion 2 includes an opening portion 3. When the door inner panel 1 is made of a steel sheet, the top panel portion 2 is formed through stretch flange deformation. Since the top panel portion 2 has the opening portion 3, it is susceptible to stretch flange deformation. FIG. 1 shows an exemplary case in which an opening portion 3 is provided at one location so as to leave a peripheral edge portion of the top panel portion 2. However, the number of locations of the opening portion 3 is not limited to one. The top panel portion 2 may include a plurality of opening portions 3. The shape of the opening portion 3 may be circular, elliptic, polygonal, or the like, and is not particularly limited. In the door inner panel 1 for an automobile, an acoustic speaker, a handle, and the like are attached in the opening portion 3.

Figure 2:
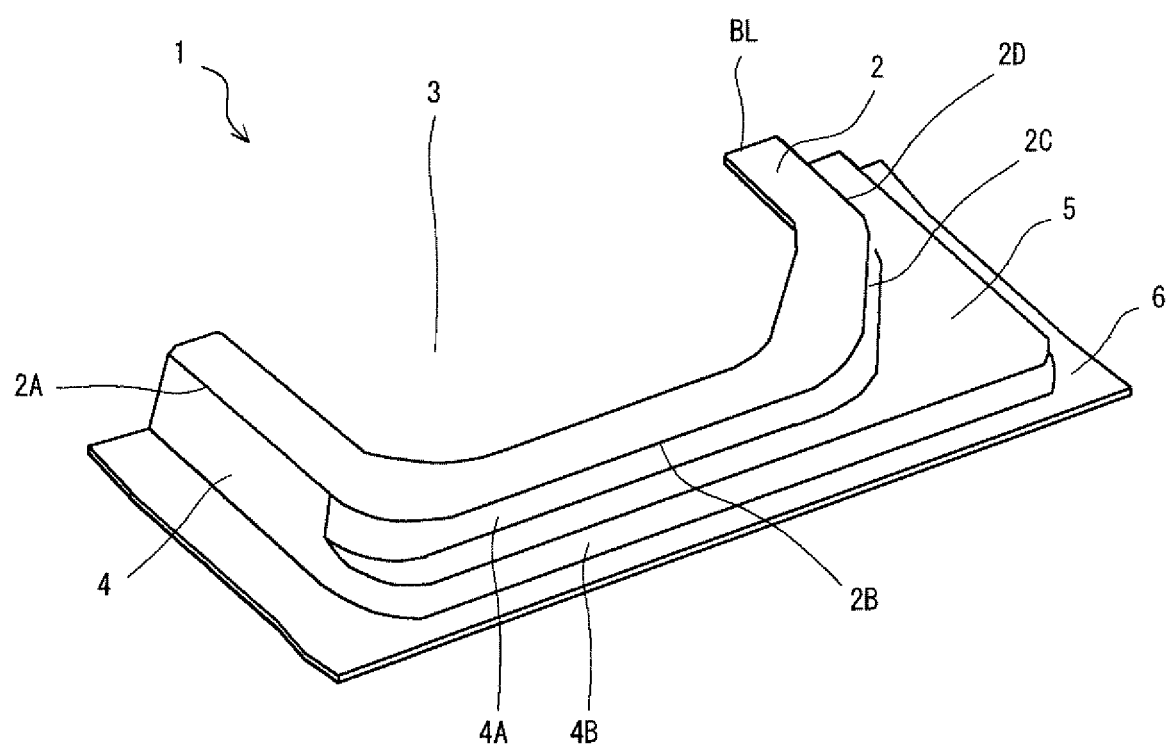
FIG. 2 is a perspective view of a door inner panel different from that of FIG. 1.

FIG. 2 is a perspective view of a door inner panel having an opening portion 3 having a shape different from that in FIG. 1. Referring to FIG. 2, the opening portion 3 extends over one border of a peripheral edge portion of a top panel portion 2. In other words, the opening portion 3 is provided such that a beltline BL is interrupted. In this case, a reinforcing member such as a beltline reinforcement may be attached to the beltline BL.

Figure 3:
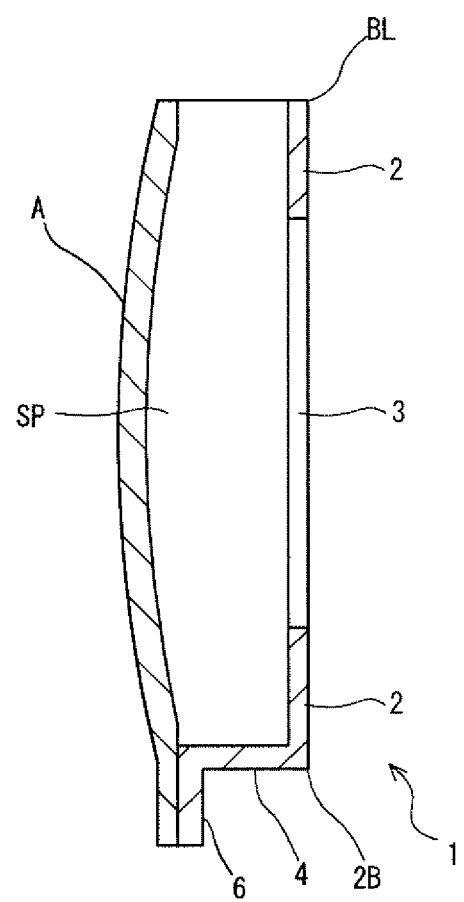
FIG. 3 is a schematic view of a vertical cross section of a side door for an automobile.

FIG. 3 is a schematic view of a vertical cross section of a side door for an automobile. Referring to FIG. 3, the side door is produced by combining a door outer panel A and a door inner panel 1. A space SP is a space between the door outer panel A and the door inner panel 1. An acoustic speaker, a window glass, a window drive device, and the like may be accommodated in the space SP. For that reason, it is often the case that the space SP is formed by providing a vertical wall portion 4 in the door inner panel 1.

In the door inner panel 1, a border on a vehicle upper side of the top panel portion 2 is a beltline BL. The beltline BL is located on an entrance/exit side of a window (not shown). When the window is opened, the window glass is lowered and accommodated in the space SP. Therefore, there is no vertical wall portion in the beltline BL.

Figure 4:
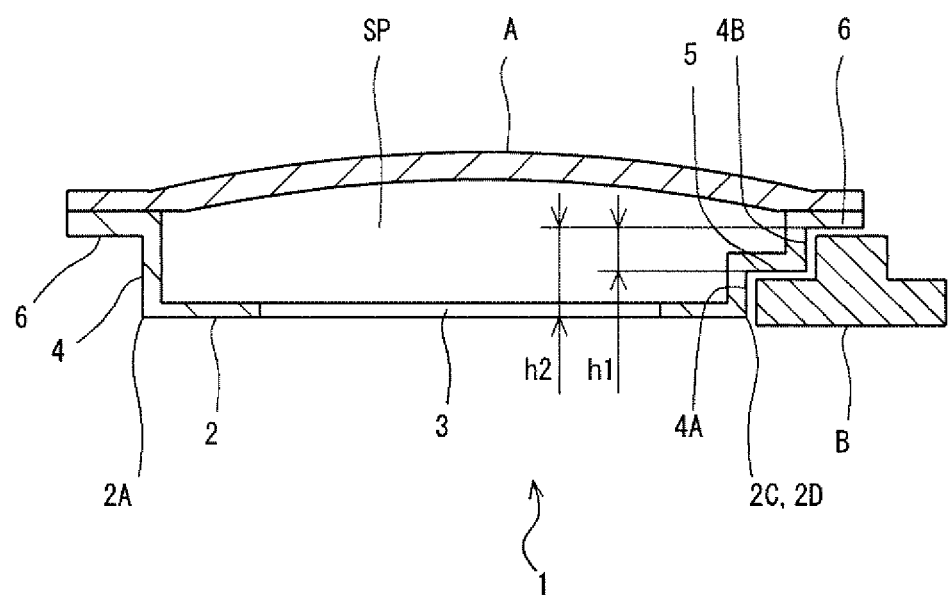
FIG. 4 is a schematic view of a horizontal cross section of a side door for an automobile and its vicinity.

FIG. 4 is a schematic view of a horizontal cross section of a side door for an automobile and its vicinity. Referring to FIG. 4, the step portion 5 faces a pillar B of the vehicle body. For that reason, the door inner panel 1 of the present embodiment allows to improve the tightness of vehicle interior of an automobile compared to a door inner panel having no step portion 5. A seal member may be disposed between the step portion 5 and the pillar B. In this case, it is possible to further improve the tightness of vehicle interior. The seal member is, for example, a rubber.

A hinge to be connected to a pillar (not shown) is attached to the vertical wall portion 4 on the vehicle front side including a border 2A of the top panel portion 2 on the vehicle front side.

The symbol h1 shown in FIG. 4 indicates a height from the flange portion 6 to the step portion 5. And h2 indicates a height from the flange portion 6 to the top panel portion 2. The door inner panel 1 of the present embodiment preferably satisfies conditions: $h2 \geq 40$ mm, and $h1/h2 < 0.8$. This is because when $h2 < 40$ mm, the space SP that accommodates a window glass and others is too small. Also that is because when $h1/h2 \geq 0.8$, the tightness of vehicle interior deteriorates as a result of a small distance between the top panel portion 2 and the step portion 5.

Second Embodiment

Figure 5:
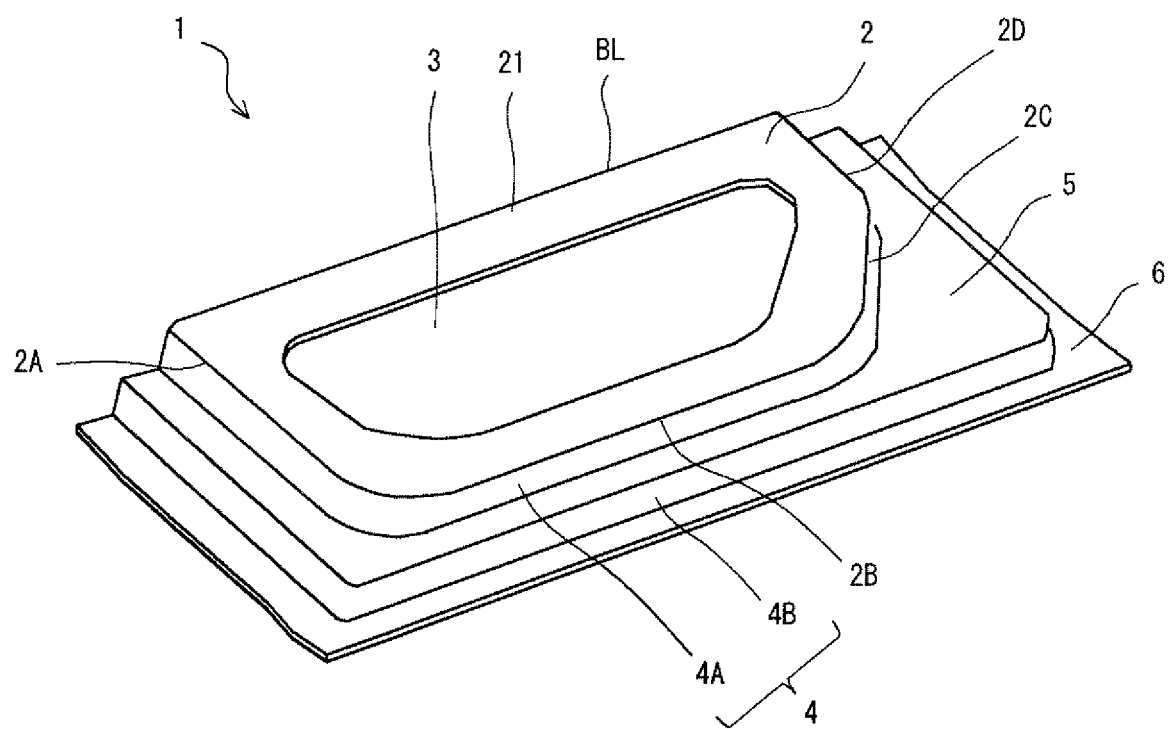
FIG. 5 is a perspective view of a door inner panel according to a second embodiment.

FIG. 5 is a perspective view of a door inner panel of a second embodiment. A door inner panel 1 of a second embodiment shown in FIG. 5 is based on the door inner panel 1 of the first embodiment described above. The same applies to a third and fourth embodiments to be described later, and overlapping explanation will be appropriately omitted.

Referring to FIG. 5, in the door inner panel 1 of the second embodiment, a step portion 5 is provided in all of the four adjacent vertical wall portions 4 (three pairs of vertical wall portions 4). In this case, the step portion 5 faces a center pillar, a front pillar, a side sill, and the like of the vehicle body. Accordingly, it is possible to further improve the tightness of vehicle interior.

Third Embodiment

Figure 6:
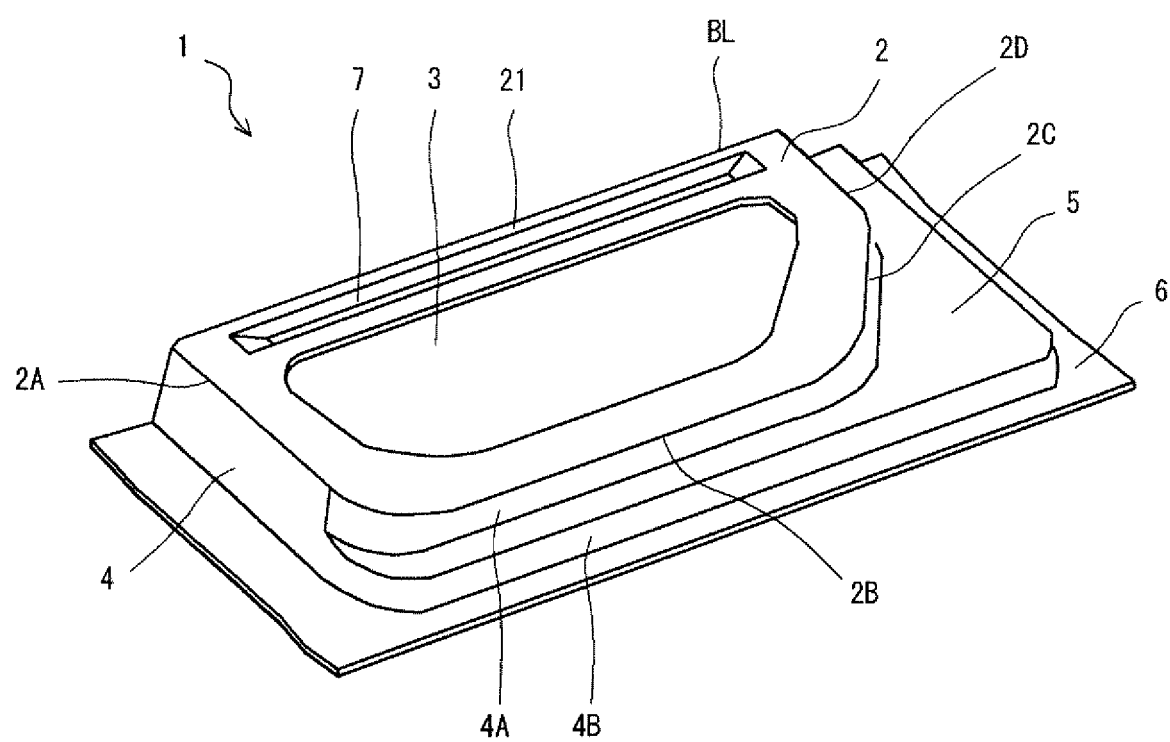
FIG. 6 is a perspective view of a door inner panel according to a third embodiment.

FIG. 6 is a perspective view of a door inner panel of a third embodiment. Referring to FIG. 6, a door inner panel 1 of the third embodiment shows a case in which a vertical wall portion 4 extends from four borders except the beltline BL out of the five borders of the top panel portion 2 having a pentagon shape, and a step portion 5 is provided in three vertical wall portions 4 of four adjacent vertical wall portions 4.

In the door inner panel 1 of the third embodiment, there is provided in an edge portion 21 on the vehicle upper side including a beltline BL of the top panel portion 2 (hereinafter referred to as a "beltline portion"), a recessed portion 7 along that beltline portion 21. Forming the recessed portion 7 increases a cross-sectional secondary moment of the beltline portion 21 of the top panel portion 2. In other words, the recessed portion 7 increases the strength of the beltline portion 21. In general, the beltline portion of a door inner panel is often reinforced by attaching a reinforcing member such as a beltline reinforcement thereto. In this regard, in the door inner panel 1 of the third embodiment, a beltline portion 21 having a recessed portion 7 is provided integrally in the top panel portion 2. In other words, in the third embodiment, the beltline reinforcement is integrated into the door inner panel. Therefore, the beltline portion 21 does not need to be reinforced by a separate beltline reinforcement. As a result of that, it is possible to reduce the number of components and assembly man-hours of a door, and further to reduce the weight of the door.

A protruded portion in place of the recessed portion 7 may be provided in the beltline portion 21, or both of the recessed portion 7 and the protruded portion may be provided. Forming the protruded portion will equally increase the cross-sectional secondary moment of the beltline portion 21 of the top panel portion 2.

Fourth Embodiment

Figure 7:
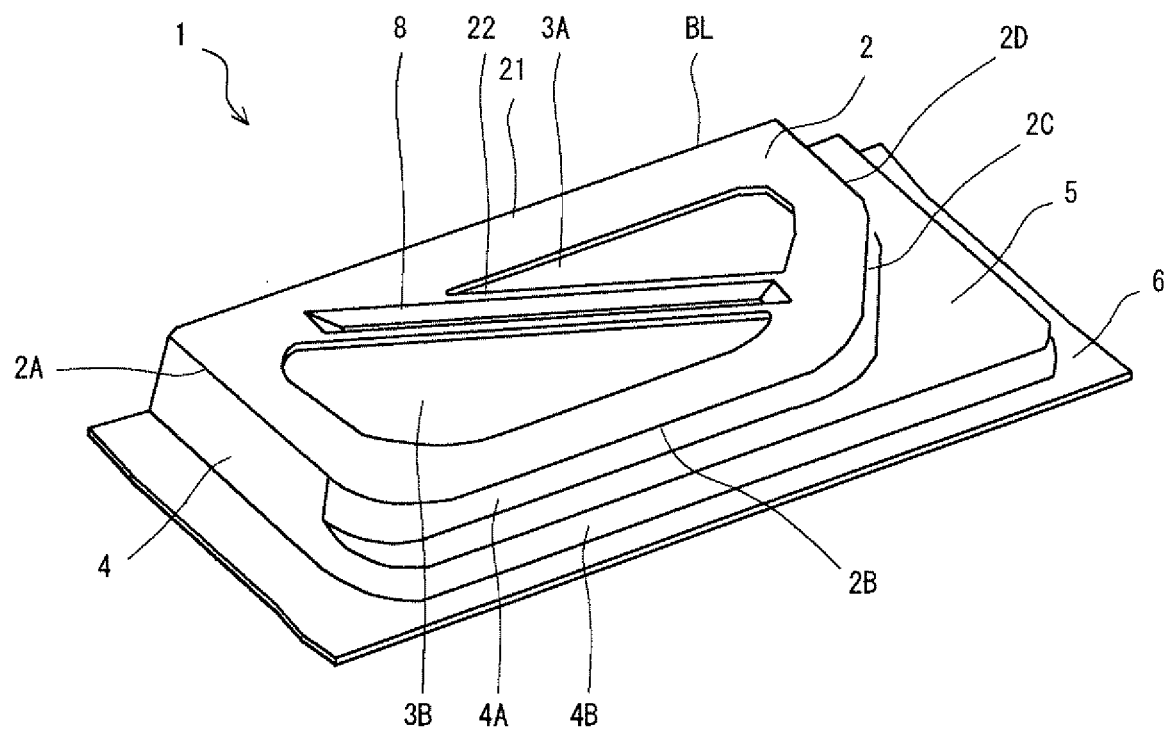
FIG. 7 is a perspective view of a door inner panel according to a fourth embodiment.

FIG. 7 is a perspective view of a door inner panel of a fourth embodiment. Referring to FIG. 7, in a door inner panel 1 of the fourth embodiment, the opening portion of the first embodiment shown in FIG. 1 is divided into multiple portions. In other words, a plurality of opening portions are provided in the top panel portion 2. FIG. 7 shows an exemplary case in which two opening portions 3A and 3B are provided.

In the door inner panel 1 of the fourth embodiment, the top panel portion 2 includes a boundary portion 22 between the opening portions 3A and 3B. The boundary portion 22 is provided with a recessed portion 8 along the boundary portion 22. Forming the recessed portion 8 increases the cross-sectional secondary moment of the boundary portion 22 of the top panel portion 2. In other words, the recessed portion 8 increases the strength of the boundary portion 22. Generally, in order to enhance the strength of a side door, the top panel portion of the door inner panel is often reinforced by attaching a reinforcing member such as a door impact beam thereto. In this regard, in the door inner panel 1 of the fourth embodiment, a boundary portion 22 having a recessed portion 8 is integrally provided in the top panel portion 2. In other words, in the fourth embodiment, a door impact beam is integrated with the door inner panel. Accordingly, the top panel portion 2 does not need to be reinforced by a door impact beam or the like. As a result, it is possible to reduce the number of components and assembly man-hours of a door, and further to reduce the weight of the door.

A protruded portion in place of the recessed portion 8 may be provided in the boundary portion 22, or both of the recessed portion 8 and the protruded portion may be provided. Forming the protruded portion will equally increase the cross-sectional secondary moment of the boundary portion 22 of the top panel portion 2.

Either one or both of the recessed portion 7 and the protruded portion shown in FIG. 6 may be added to the beltline portion 21 of the door inner panel 1 of the fourth embodiment shown in FIG. 7.

Here, a panel-shaped inner panel like a door inner panel, in which a step portion is provided at vertical wall portions adjacent to each other, is very difficult to be formed, and is likely to have defects such as cracks and wrinkles at the time of press forming. For that reason, conventionally, a low-strength steel sheet having high ductility is used as the starting material when forming a formed product having a complicated shape. As a result of that, there has been a limit in the improvement of collision characteristics of a panel-shaped formed product. In this regard, by providing an opening portion in the top panel portion and applying hot stamping thereto, defects such as cracks, wrinkles, and the like are suppressed even when the formed product has a complicated shape having a vertical wall portion and a step portion, making it possible to obtain a high-strength panel-shaped formed product having a tensile strength of not less than 1200 MPa.

The steel sheet to be used as the starting material of the panel-shaped formed product of the present embodiment preferably contains, in mass %, carbon (C): not less than 0.11%. When the steel sheet contains not less than 0.11% of carbon, it is possible to increase the strength of the panel-shaped formed product after hot stamping.

By increasing the strength of the panel-shaped formed product as described above, and applying it to a door inner panel of an automobile, the collision characteristics of a door will be improved. The hardness of the panel-shaped formed product is preferably not less than HV 380 in the Vickers hardness. A hardness of HV 380 corresponds to a tensile strength of 1200 MPa. The Vickers hardness HV conforms to JIS Z 2244.

A door inner panel having a high tensile strength is usually difficult to be formed. Hereinafter, an example of a method for producing the door inner panel of the above-described embodiments will be described. The following production method shows an exemplary case in which the door inner panel to be produced is made of a steel sheet and has a tensile strength of not less than 1200 MPa.

Production Method

A method for producing a door inner panel of the present embodiment includes a preparation step, a heating step, and a press forming step by hot stamping. In the preparation step, a blank material made of a steel sheet is prepared. In the heating step, the blank material is heated. In the press forming step, the heated blank material is subjected to press working, and at the same time, the formed door inner panel is quenched. In the press forming step of the present embodiment, a hot stamping apparatus is used as a press working apparatus.

[Hot Stamping Apparatus 10]

Figure 8:
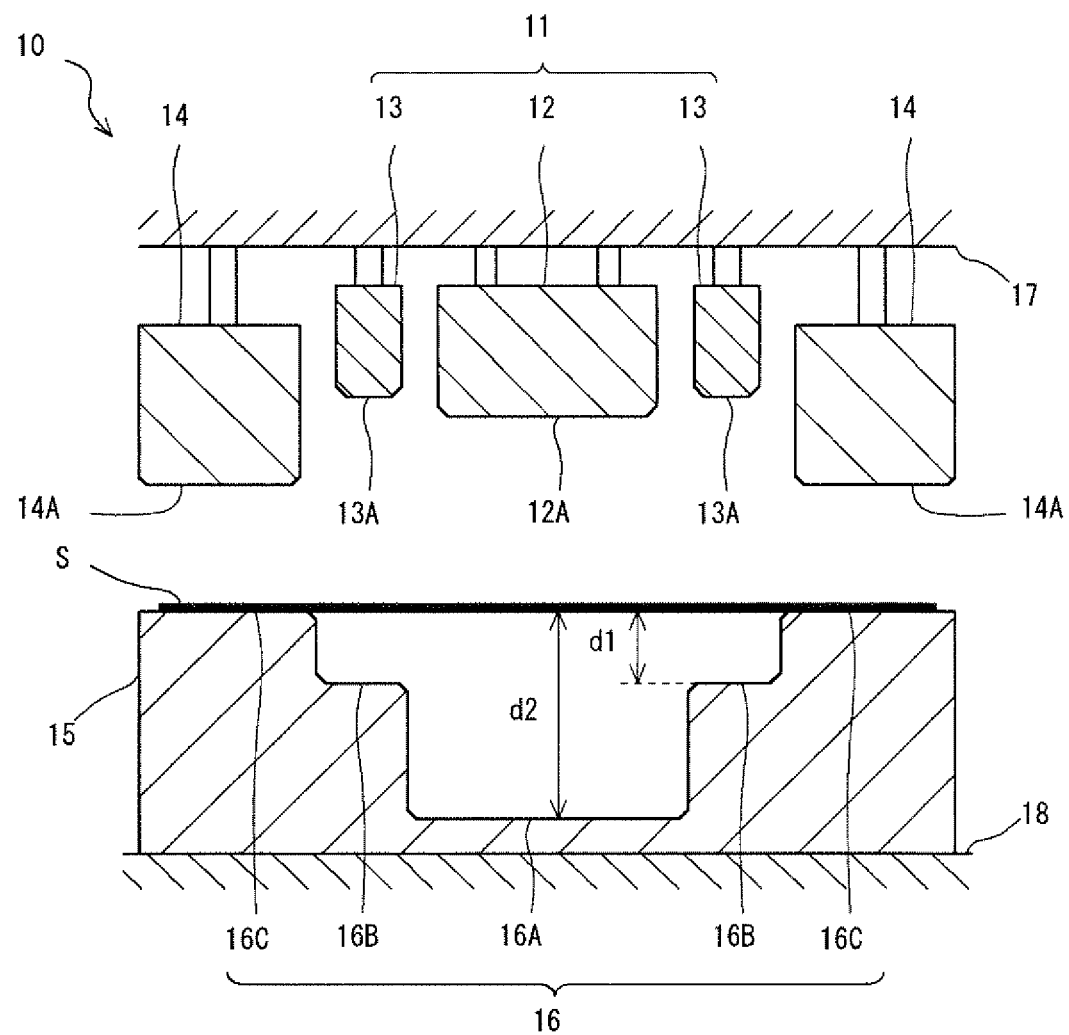
FIG. 8 is a schematic view of a hot stamping apparatus used for press forming of the door inner panel of the present embodiment.

FIG. 8 is cross sectional view to schematically show a hot stamping apparatus for producing a door inner panel of the present embodiment. Referring to FIG. 8, the hot stamping apparatus 10 includes a punch 11 and a blank holder 14 as an upper die, and a die 15 as a lower die.

The punch 11 includes a first punch 12 and a second punch 13. The first punch 12 includes a front end surface 12A. The front end surface 12A of the first punch 12 is shaped with a shape of a top panel portion of the door inner panel. The second punch 13 includes a front end surface 13A. The front end surface 13A of the second punch 13 is shaped with the shape of the step portion of the door inner panel. The punch 11 pushes in a blank material S on a die engraved portion 16 of the die 15 to form a door inner panel.

The blank holder 14 is disposed adjacent to at least a part of the outside of the second punch 13. The blank holder 14 has a front end surface 14A. The front end surface 14A of the blank holder 14 faces a reference surface 16C of the die 15. The blank holder 14 clamps the blank material S between itself and the reference surface 16C of the die 15.

The die 15 includes a die engraved portion 16. The die engraved portion 16 includes a die bottom surface 16A, a step surface 16B, and a reference surface 16C. The die bottom surface 16A faces the front end surface 12A of the first punch 12. The step surface 16B faces the front end surface 13A of the second punch 13.

The first punch 12, the second punch 13, and the blank holder 14 are supported by an upper die holder 17. A pressurizing member (not shown) is provided between the second punch 13 and the blank holder 14, and the upper die holder 17. The pressurizing member is a hydraulic cylinder, a gas cylinder, a spring, a rubber, or the like. The die 15 is secured to a lower die holder 18. The upper die holder 17 is attached to a slide (not shown). The lower die holder 18 is attached to a bolster plate (not shown). Here, the hot stamping apparatus 10 is not limited to the case shown in FIG. 8. For example, the first punch 12, the second punch 13, and the blank holder 14 may be individually attached to a movable slide.

The die bottom surface 16A and the front end surface 12A of the first punch 12 forms the top panel portion 2 of the door inner panel 1 shown in FIG. 1. The step surface 16B and the front end surface 13A of the second punch 13 form the step portion 5 of the door inner panel 1 shown in FIG. 1. The reference surface 16C and the front end surface 14A of the blank holder 14 form the flange portion 6 of the door inner panel 1 shown in FIG. 1.

In the die 15, a depth d1 from the reference surface 16C to the step surface 16B, and a depth d2 from the reference surface 16C to the die bottom surface 16A preferably satisfy conditions: $d2 \geq 40$ mm, and $d1/d2 < 0.8$. The depth d1 and the depth d2 respectively correspond to the height h1 and the height h2 shown in FIG. 4. Therefore, when $d2 < 40$ mm, the space for accommodating a window glass and others is too small. Moreover, when $d1/d2 \geq 0.8$, since the distance between the top panel portion 2 and the step portion 5 is small, the tightness of vehicle interior deteriorates.

The hot stamping apparatus 10 of the present embodiment shows a case in which it includes a punch 11 and a blank holder 14 above the apparatus, and the die 15 below the apparatus. However, the arrangement will not be limited to the case shown in FIG. 8. In other words, in the hot stamping apparatus 10, the arrangement of the punch 11 and the blank holder 14, and the die 15 may be inverted upside down. In short, any configuration may be adopted provided that the punch 11 and the blank holder 14 are relatively movable with respect to the die 15. Hereinafter, the steps of the production method of the present embodiment will be described.

[Preparation Step]

In the preparation step, a blank material made of a steel sheet is prepared. The steel sheet of the door inner panel of the present embodiment preferably contains carbon (c): not less than 0.11%. When the steel sheet contains not less than 0.11% of carbon, it is possible to increase the strength of the door inner panel after hot stamping.

[Heating Step]

In the heating step, the blank material is heated by a heating apparatus (not shown). When the blank material is a steel sheet, the heating temperature is preferably not less than 700° C. The heating temperature is, for example, 900° C. The heating temperature is appropriately set depending on a material type, a degree of forming difficulty, or the like. In the hot stamping, since the blank material is heated to be softened, it is possible to form a complicated shape. The complicated shape includes, for example, a shape like a door inner panel 1 shown in FIG. 1, in which adjacent vertical wall portions 4 have a step portion 5.

Preferably, the blank material is heated to not less than an A1 transformation point of the material. The blank material is more preferably heated to not less than an A3 transformation point. In the hot stamping, concurrently with the blank material being press formed, the formed door inner panel is quenched. When the blank material is heated to not less than the A1 point, the door inner panel after quenching will have a martensitic structure, and thus a high strength.

[Press Forming Step]

Figure 9A:
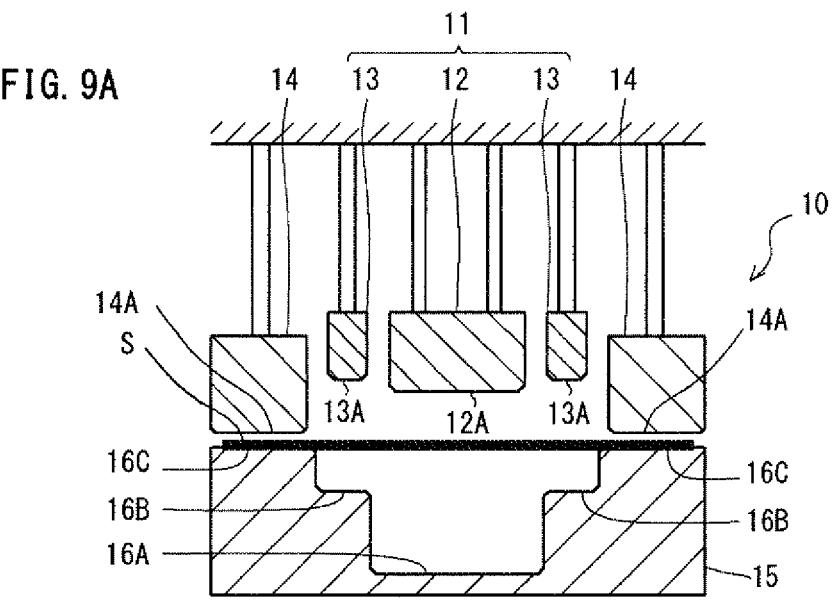
FIG. 9A shows a stage of clamping a blank material with a blank holder in a press forming step of the present embodiment.
Figure 9B:
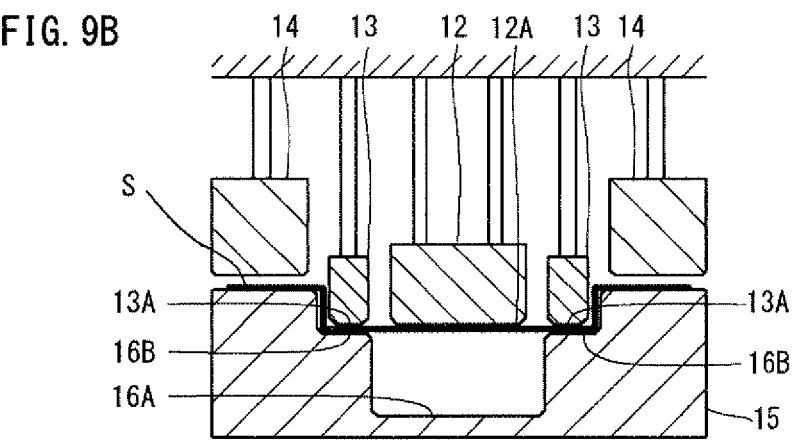
FIG. 9B shows a state in which pushing in by a second punch is completed in the press forming step of the present embodiment.
Figure 9C:
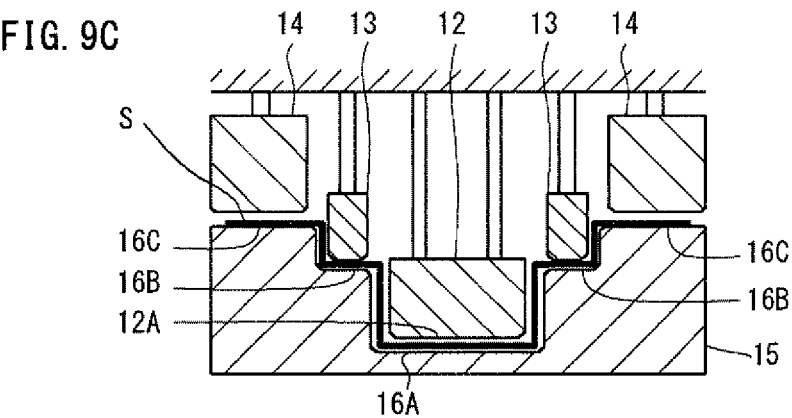
FIG. 9C shows a state in which pushing in by a first punch is completed in the press forming step of the present embodiment.

FIGS. 9A to 9C are cross sectional views schematically showing the press forming step of the present embodiment. FIG. 9A shows a stage of clamping a blank material S with a blank holder 14. FIG. 9B shows a state when pushing in by the second punch 13 is completed. FIG. 9C shows a state when pushing in by the first punch 12 is completed.

Referring to FIG. 9A, the heated blank material S is placed in the hot stamping apparatus 10. After the blank material S is placed, the slide moves down. This causes the blank material S to be clamped between the front end surface 14A of the blank holder 14 and the reference surface 16C of the die 15. However, the spacing between the front end surface 14A of the blank holder 14 and the reference surface 16C of the die 15 is preferably larger than the thickness of the blank material S. In other words, a gap is provided between the blank material S and the front end surface 14A of the blank holder 14. The size of the gap is, for example, 0.1 mm. When the blank material S is brought into contact with the blank holder 14, a portion of the blank material S, which is brought into contact with the blank holder 14, is cooled before the blank material S is press formed. For that reason, the cooling rate of the blank material S varies at locations, and therefore the strength of the formed product varies at locations. Therefore, it is preferable that a slight gap is provided between the front end surface 14A of the blank holder 14 and the blank material S.

Referring to FIG. 9B, as the slide further moves down, the blank material S is pointing formed by the punch 11 and the die 15. FIG. 9B shows a case in which when pushing in on the blank material S by the second punch 13 is completed, the front end surface 12A of the first punch 12 is located at the same height as the front end surface 13A of the second punch 13. In other words, it shows a case in which concurrently with completion of pushing in on the blank material S by the second punch 13, pushing in on the blank material S by the first punch 12 is started. However, when pushing in on the blank material S by the second punch 13 is completed, the height of the front end surface 12A of the first punch 12 is not limited to the same height as that of the front end surface 13A of the second punch 13. The front end surface 12A of the first punch 12 at this moment may be located either at a higher position or at a lower position than that of the front end surface 13A of the second punch 13. In other words, after the pushing in on the blank material S by the second punch 13 is completed, the pushing in on the blank material S by the first punch 12 may be started. Moreover, before the pushing in on the blank material S by the second punch 13 is completed, the pushing in on the blank material S by the first punch 12 may be started. In either case, the pushing in by the first punch 12 will not be completed prior to the pushing in by the second punch 13. Note that holding down of the blank material by the blank holder and the die only needs to be performed by the time the forming by the second punch is completed.

Referring to FIG. 9C, after the pushing in by the second punch 13 is completed, the first punch 12 moves down and the blank material S is pointing formed. At this moment, a portion of the blank material S, which has been pushed in by the second punch 13, is restricted by the second punch 13. This allows suppression of wrinkles which occur in the vicinity of the step portion of the door inner panel. This point will be described in detail below.

[Suppression of Cracks and Wrinkles]

FIG. 10 is a cross-sectional view showing a state during press working by a common hot stamping apparatus. FIG. 10 shows an enlarged view of the vicinity of a step surface of the die of the common hot stamping apparatus. Referring to FIG. 10, in a hot stamping apparatus 200, front end surfaces 210A and 210B of a punch 210 are integrally shaped with the punch 210. As a result of that the front end surfaces 210A and 210B of the punch 210 simultaneously reach a die bottom surface 220A and a step surface 220B of a die 220. The distance over which the front end surface 210A pushes in on the blank material S is longer than that of the front end surface 210B. As a result of that, as shown in FIG. 10, when the punch 210 is moved down, first, the front end surface 210A pushes in on the blank material S. At this moment, a portion S1 of the blank material S is not restricted by the front end surface 210B of the punch 210 and the step surface 220B of the die 220. In other words, the portion S1 of the blank material S will not come into contact with the front end surface 210B of the punch 210 and the step surface 220B of the die 220.

In hot stamping, the blank material is cooled by the contact between the blank material, and the punch, the die, and the like. Therefore, in the stage shown in FIG. 10 during press working, a portion S1 of the blank material S is not cooled. The portion S1 of the blank material S is cooled when the punch 210 is further pushed in from the position shown in FIG. 10. In short, when a door inner panel in which a step portion is provided in a vertical wall portion is formed by a punch 210 in which shapes of the top panel portion and the step portion of the door inner panel are integrally shaped, a portion S1 of the blank material S is cooled slower than the other portions.

If the cooling of the blank material S is partially delayed, the strength and ductility of the blank material S may be partially different. In this case, cracks and wrinkles are more likely to occur in the formed door inner panel. As shown in FIG. 1, when adjacent vertical wall portions 4 of the door inner panel 1 have a step portion 5, particularly cracks and wrinkles become more likely to occur. When the strength of the door inner panel after forming is high, cracks, wrinkles and the like become further likely to occur.

A method for producing a door inner panel of the present embodiment uses, as shown in FIG. 8, a hot stamping apparatus 10 including a first punch 12 and a second punch 13. As a result, the top panel portion 2 and the step portion 5 of the door inner panel 1 as shown in FIG. 1 are formed by separate punches. In addition, pushing in by the second punch 13 is completed prior to pushing in by the first punch 12. Thereby, when one of the punches forms the top panel portion 2, the other punch holds down the step portion 5 of the door inner panel 1. Therefore, when the top panel portion 2 is formed, an unrestricted portion of the blank material is reduced, thereby allowing to suppress cracks and wrinkles of the door inner panel.

The blank material S may have an opening portion. In this case, the blank material S has an opening portion at a position facing the die bottom surface 16A of the die 15. As a result, as shown in FIG. 1, a door inner panel 1 having an opening portion 3 in the top panel portion 2 is formed. In other words, the opening portion of the blank material S corresponds to the opening portion 3 of the door inner panel 1. When the blank material S has an opening portion, the top panel portion 2 is formed by stretch flange forming. Specifically, when the first punch 12 processes the blank material S, an outer edge of the opening portion extends in a direction in which the opening portion extends. Therefore, cracks are less likely to occur even when the first punch 12 is pushed in. Further, in hot stamping, since the blank material S is heated, its ductility is improved, thus facilitating stretch flange forming.

Other Production Methods

Figure 11A:
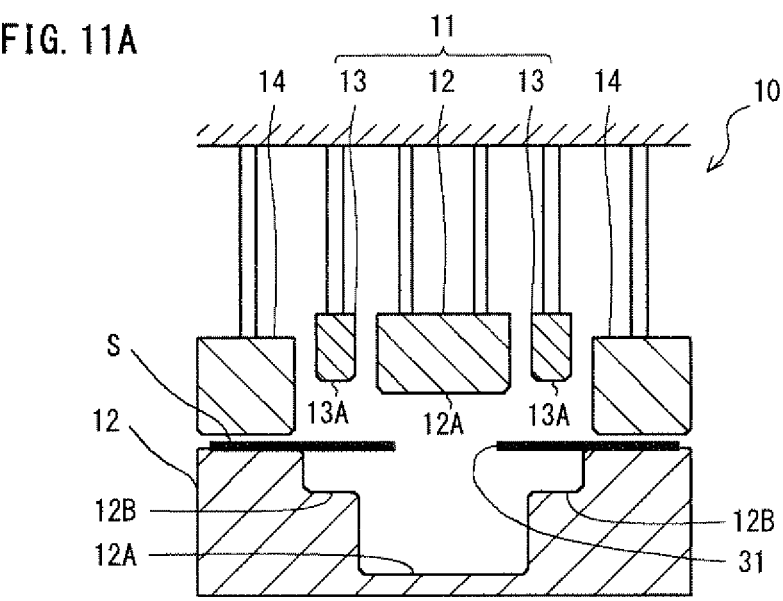
FIG. 11A shows a stage of clamping a blank material with a blank holder in a press forming step different from that of FIGS. 9A to 9C.
Figure 11B:
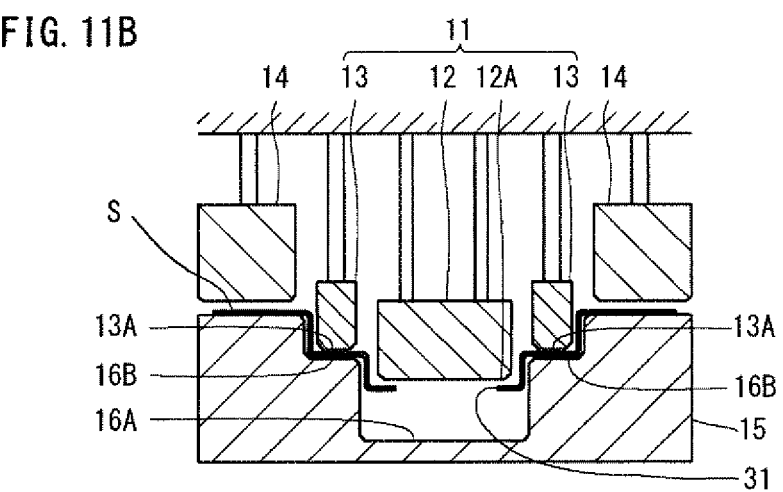
FIG. 11B shows a state in which pushing in by the second punch is completed in a press forming step different from that of FIGS. 9A to 9C.
Figure 11C:
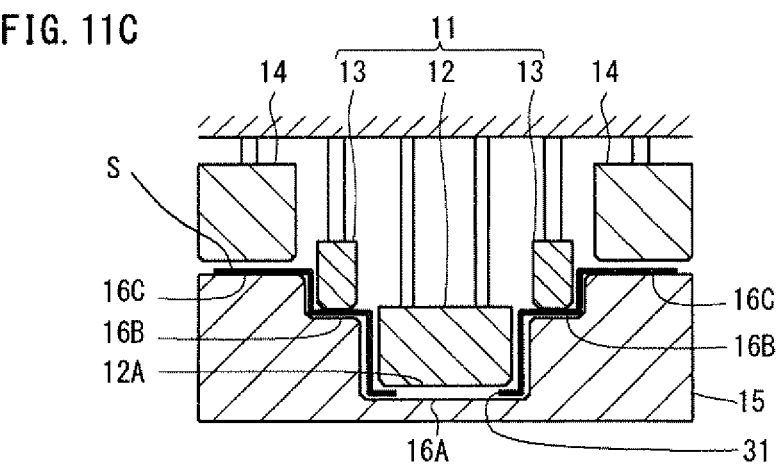
FIG. 11C shows a state in which pushing in by the first punch is completed in a press forming step different from that of FIGS. 9A to 9C.

FIGS. 11A to 11C are cross-sectional views to schematically show a press forming step, which is different from that of FIGS. 9A to 9C. FIG. 11A shows a stage of clamping a blank material S with a blank holder 14. FIG. 11B shows a state when pushing in by the second punch 13 is completed. FIG. 11C shows a state when pushing in by the first punch 12 is completed Referring to FIG. 11B, in a press forming step which is different from that in FIG. 9A to 9C, when pushing in on the blank material S by the second punch 13 is completed, the front end surface 12A of the first punch 12 is located below the front end surface 13A of the second punch 13. In other words, before pushing in on the blank material S by the second punch 13 is completed, the pushing in on the blank material S by the first punch 12 is started. At this time, the pushing in on the blank material S by the first punch 12 has not been completed. In this case as well, the second punch 13 holds down the blank material S before the pushing in by the first punch 12 is completed. As a result, even if a door inner panel having a shape of a high degree of forming difficulty is formed, it is possible to suppress cracks, wrinkles, and the like. FIGS. 11A to 11C show a case in which a blank material S has an opening portion 31. Accordingly, the top panel portion of the door inner panel is formed by stretch flange forming.

In hot stamping, quenching is performed simultaneously with the forming of the blank material. Specifically, the blank material is cooled by contact with a punch, a die, and a holder. As a result, a high-strength door inner panel can be formed. The high-strength door inner panel is, for example, a formed product having a tensile strength of not less than 1200 MPa.

In a production method of the present embodiment, the height position of the front end surface 12A of the first punch 12 is not particularly limited before pushing in by the second punch 13 is completed. In short, the first punch 12 may first push in the blank material S, or the second punch 13 may first push in the blank material S. It is only needed that the pushing in on the blank material S by the second punch 13 is completed prior to the pushing in on the blank material S by the first punch 12. As a result, it is possible to form a door inner panel having a shape of a high degree of forming difficulty. Moreover, moving down of the blank holder only needs to be performed by the time the pushing in by the second punch is completed.

However, when a low-strength steel sheet having high ductility is used for the steel sheet, the pushing in on the blank material S by the first punch 12 may be completed prior to the pushing in on the blank material S by the second punch 13. In short, since the production method of the present embodiment uses a divided punch, it is possible to press form the door inner panel into shapes of various degrees of forming difficulty.

The production method of the present embodiment has described a case in which a door inner panel is produced by a hot stamping apparatus including a first and second punches. However, the number of punches is not limited to two. The second punch may be divided into multiple punches. In short, a hot stamping apparatus including three or more punches may be used. In this case, multiple step portions are provided on the vertical wall portion of the door inner panel In the production method described above, the steel sheet may be a tailored blank. Hereinafter, an example of the door inner panel which is produced from a tailored blank will be described.

Fifth Embodiment

Figure 12:
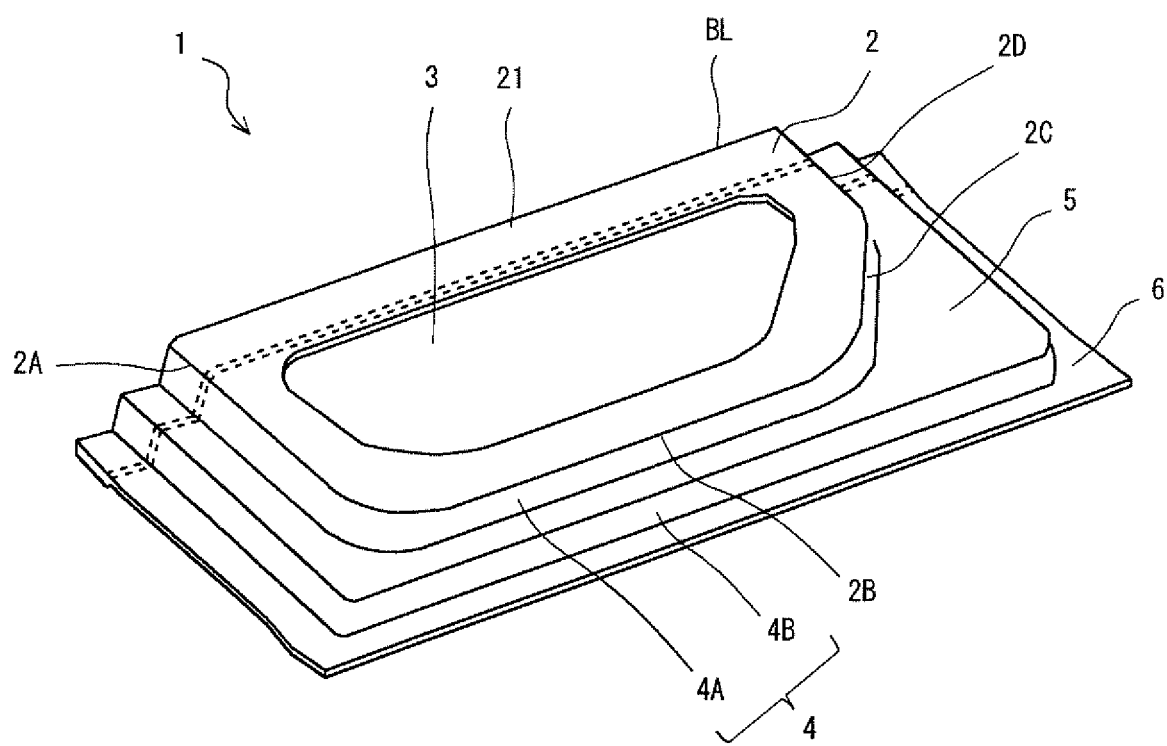
FIG. 12 is a perspective view of a door inner panel of a fifth embodiment.
Figure 13A:
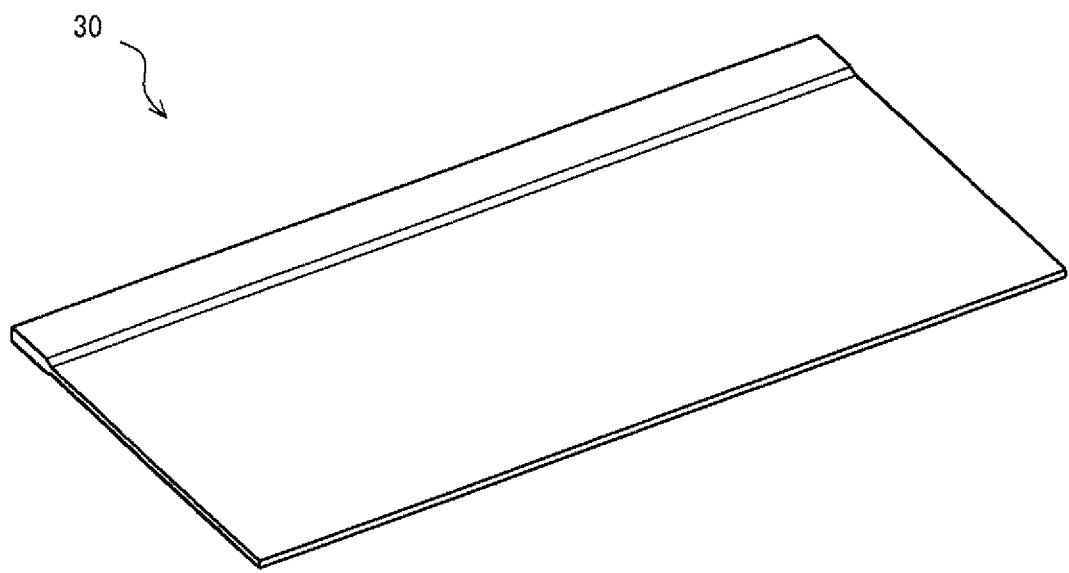
FIG. 13A is a perspective view of a starting material of the door inner panel shown in FIG. 12, showing a state before being punched an opening portion.
Figure 13B:
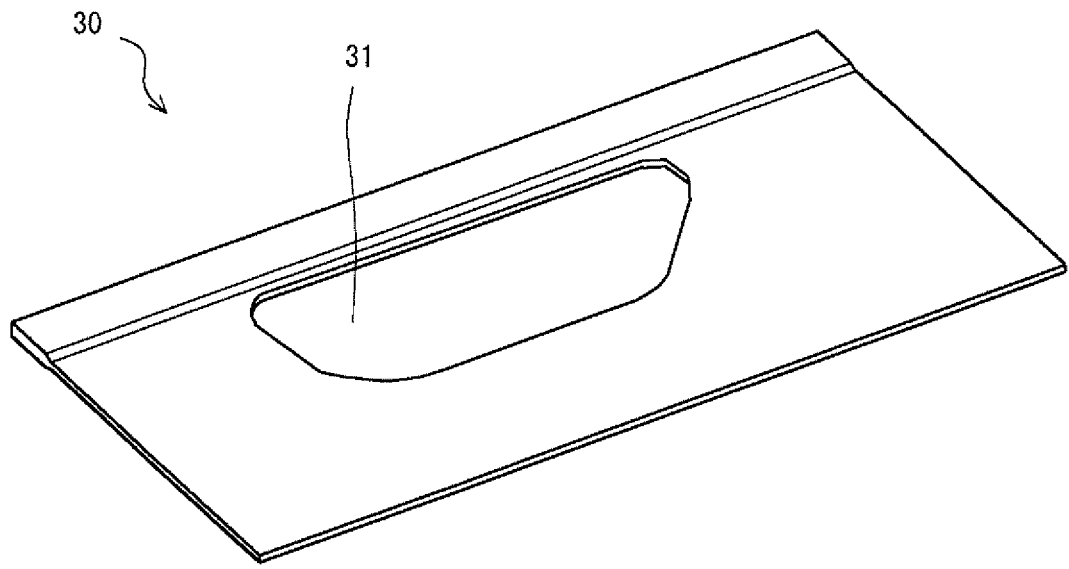
FIG. 13B is a perspective view of a starting material of the door inner panel shown in FIG. 12, showing a state after

FIG. 12 is a perspective view of a door inner panel of a fifth embodiment. FIG. 13A and FIG. 13B are perspective views each showing a starting material of the door inner panel shown in FIG. 12. Of these figures, FIG. 13A shows a state being punched an opening portion. FIG. 13B shows a state after being punched an opening portion, and immediately before subjected to hot stamping.

Compared with the door inner panels of the first to fourth embodiments described above, the door inner panel of the fifth embodiment shown in FIG. 12 is similar in that it is formed by hot stamping as described above, but is different in that it uses a tailored blank as the starting material. The tailored blank is broadly classified into a tailored welded blank (hereinafter referred to as "TWB") and a tailored rolled blank (hereinafter also referred to as "TRB"). TWB is a blank in which multiple kinds of steel sheets having different sheet thicknesses, tensile strengths, etc. are integrated together by welding (for example, butt welding). On the other hand, TRB is a blank in which the sheet thickness is varied by changing the spacing of the rolling rolls in the production of the steel sheet. FIGS. 13A and 13B show an exemplary case in which the tailored blank is TRB.

Referring to FIG. 12, in the door inner panel 1 of the fifth embodiment, a step portion 5 is provided in all of four adjacent vertical wall portions 4 (three pairs of vertical wall portions 4) as in the door inner panel 1 of the second embodiment shown in FIG. 5. The opening portion 3 is provided at one place so as to leave a peripheral edge portion of the top panel portion 2. In this door inner panel 1, the sheet thickness of a region of an edge portion (beltline portion 21) on the vehicle upper side including a border (beltline BL) on the vehicle upper side of the top panel portion 2 is larger than that of a region adjacent to this region. In other words, the sheet thickness of the door inner panel 1 is not constant, and the sheet thickness of the beltline portion 21 is increased. As a result, the strength of the beltline portion 21 is increased so that the collision characteristic of the door inner panel is improved. In addition, when there is a region other than the beltline portion 21, in which high strength is not required, it is expected to reduce the weight of the door inner panel 1 by decreasing the sheet thickness of that region.

The door inner panel 1 of the fifth embodiment is produced by using a starting material (TRB) shown in FIGS. 13A and 13B. Specifically, first, a TRB 30 having a contour shape corresponding to the contour shape of the door inner panel 1 is prepared as shown in FIG. 13A. In this TRB 30, the sheet thickness of a region corresponding to the beltline portion 21 of the door inner panel 1 is larger than those of other regions. Next, the TRB 30 is formed with an opening portion 31 corresponding to the opening portion 3 of the top panel portion 2 of the door inner panel 1. This opening portion 31 is formed, for example, by punching. By subjecting the TRB 30 having such opening portion 31 to the hot stamping as described above, it is possible to form the door inner panel 1 as shown in FIG. 12.

In the fifth embodiment, a TWB may be used, as the starting material, in place of the TRB.

Sixth Embodiment

Figure 14:
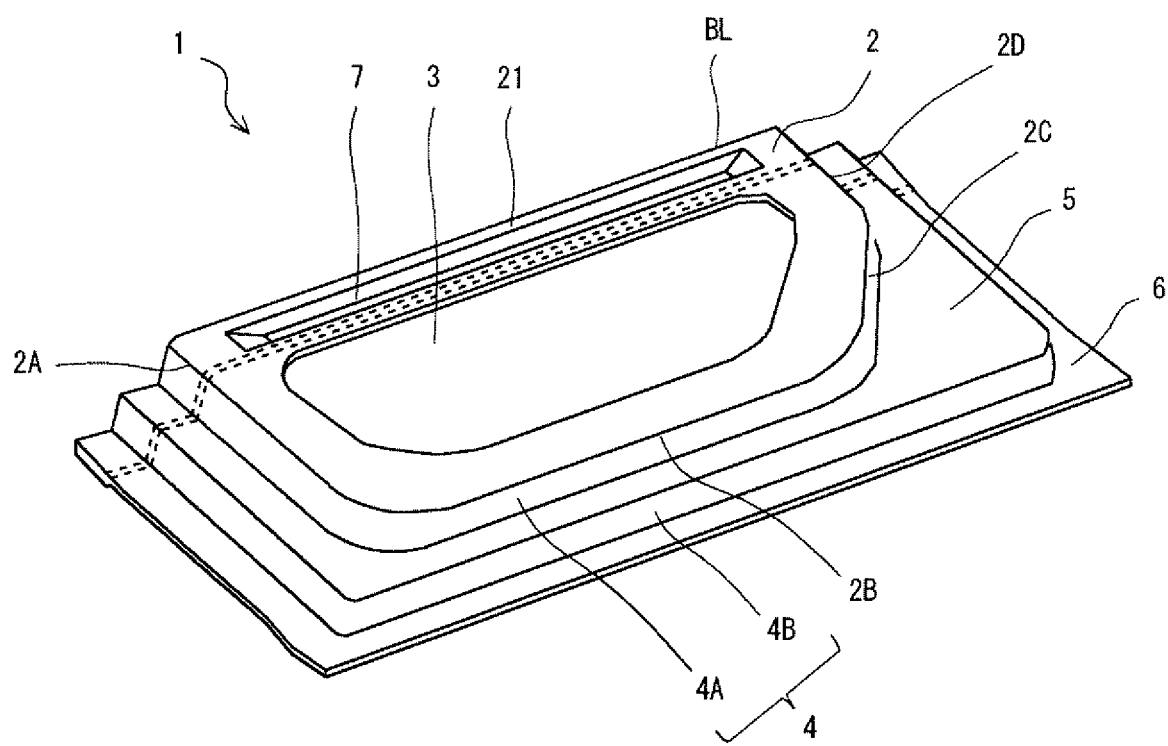
FIG. 14 is a perspective view of a door inner panel of a sixth embodiment.

FIG. 14 is a perspective view of a door inner panel of a sixth embodiment. The door inner panel 1 of the sixth embodiment shown in FIG. 14 is a modification of the door inner panel of the fifth embodiment shown in FIG. 12 modified according to the third embodiment.

Referring to FIG. 14, in the door inner panel 1 of the sixth embodiment, as with the door inner panel 1 of the third embodiment shown in FIG. 6, a recessed portion 7 is provided in the beltline portion 21 of the top panel portion 2 along the beltline portion 21 as in the door inner panel 1 of the third embodiment shown in FIG. 6. Since the recessed portion 7 is provided in the beltline portion 21 having a large sheet thickness, the strength of the beltline portion 21 is further increased. Thus, the beltline portion 21 also plays a role of a beltline reinforcement. The beltline portion 21 may be provided either with a protruded portion in place of the recessed portion 7, or with both the recessed portion 7 and the protruded portion.

The door inner panel 1 of the sixth embodiment is produced by using the starting material shown in FIGS. 13A and 13B as in the fifth embodiment. The recessed portion 7 is formed by hot stamping.

Seventh Embodiment

Figure 15:
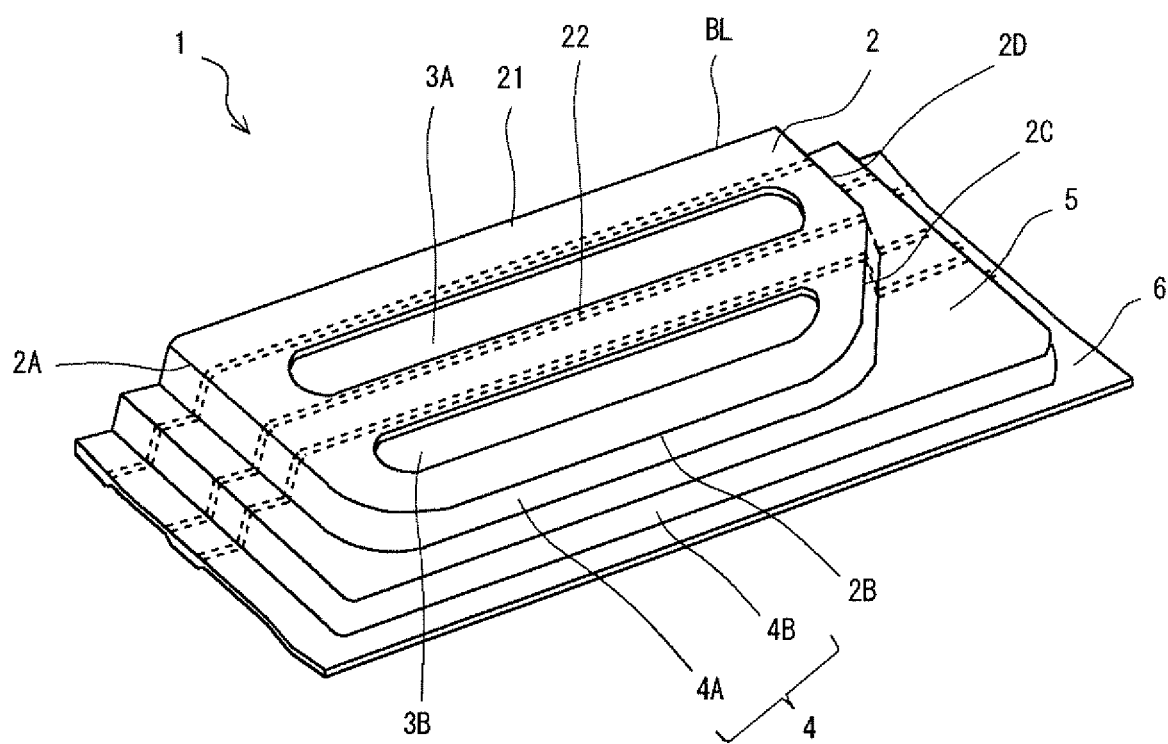
FIG. 15 is a perspective view of the door inner panel of a seventh embodiment.
Figure 16A:
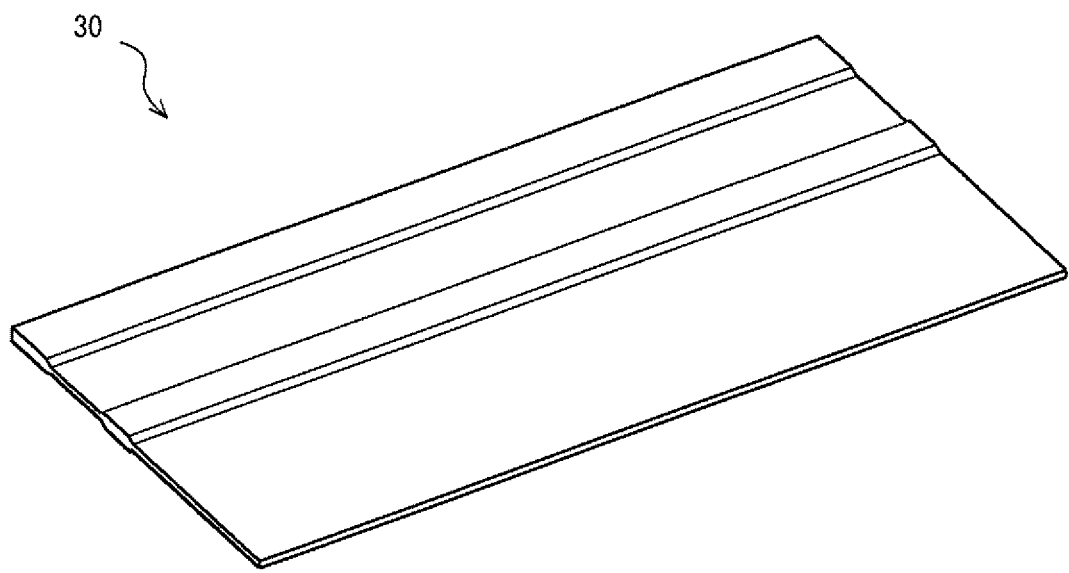
FIG. 16A is a perspective view of a starting material of the door inner panel shown in FIG. 15, showing a state before being punched an opening portion.
Figure 16B:
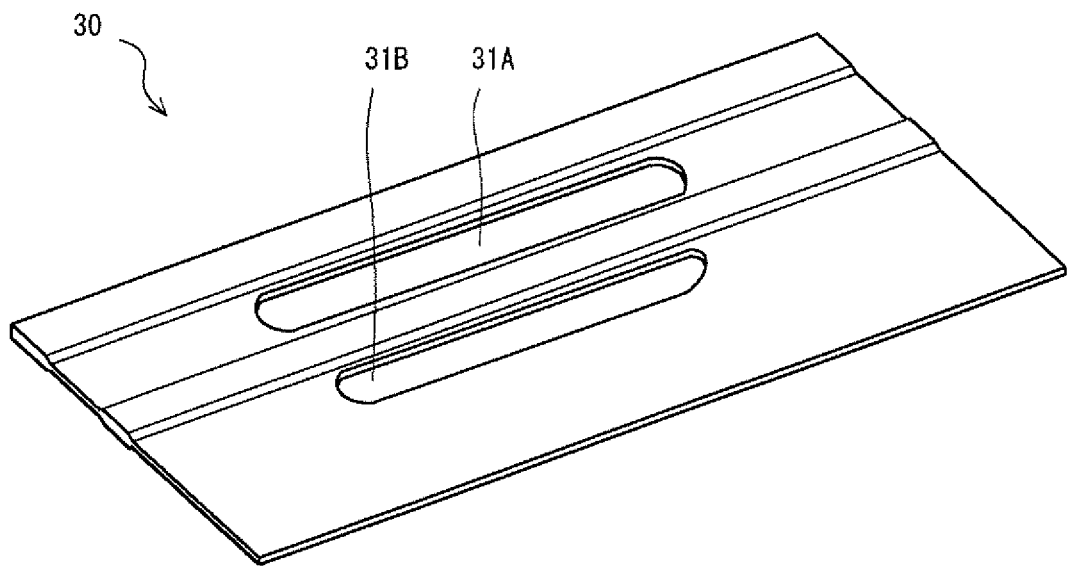
FIG. 16B is a perspective view of a starting material of the door inner panel shown in FIG. 15, showing a state after being punched an opening portion and immediately before being subjected to hot stamping.

FIG. 15 is a perspective view of a door inner panel of a seventh embodiment. FIGS. 16A and 16B are perspective views each showing the starting material of the door inner panel shown in FIG. 15. Of these figures, FIG. 16A shows a state before being punched an opening portion. FIG. 16B shows a state after being punched the opening portion, and immediately before being subjected to hot stamping. The door inner panel 1 of the seventh embodiment shown in FIG. 15 is a modification of the door inner panel 1 of the fifth embodiment shown in FIG. 12 modified according to the fourth embodiment.

Referring to FIG. 15, in the door inner panel 1 of the seventh embodiment, a plurality of opening portions 3A and 3B are provided in the top panel portion 2 as in the door inner panel 1 of the fourth embodiment. FIG. 15 shows an exemplary case in which two opening portions 3A and 3B are provided. The top panel portion 2 has a boundary portion 22 between the opening portions 3A and 3B. The boundary portion 22 extends in a fore-and-aft direction substantially parallel to the beltline portion 21. In this door inner panel 1 the sheet thickness of a region of the beltline portion 21 of the top panel portion 2 is larger than that of a region adjacent to this region. Further, the sheet thickness of a region of the boundary portion 22 of the top panel portion 2 is larger than that of a region adjacent to this region. In other words, the sheet thickness of the door inner panel 1 is not constant, but the sheet thicknesses of the beltline portion 21 and the boundary portion 22 are increased. As a result, the strength of the beltline portion 21 and the boundary portion 22 is increased, and the collision characteristic of the door inner panel is improved. Moreover, when there is a region other than the boundary portion 22, in which high strength is not required, it is expected to reduce the weight of the door inner panel 1 by reducing the sheet thickness of that region.

The door inner panel 1 of the seventh embodiment is produced by using the starting material shown in FIGS. 16A and 16B. Specifically, first, a TRB 30 having a contour shape corresponding to the contour shape of the door inner panel 1 is prepared as shown in FIG. 16A. In this TRB 30, the sheet thickness of regions respectively corresponding to the beltline portion 21 and the boundary portion 22 of the door inner panel 1 are larger than those of other regions. Next, the TRB 30 is formed with opening portions 31A and 31B corresponding to the opening portions 3A and 3B of the top panel portion 2 of the door inner panel 1. By applying the hot stamping described above to the TRB 30 having such opening portions 31A and 31B, it is possible to form the door inner panel 1 shown in FIG. 15.

The door inner panel 1 of the seventh embodiment may also be varied such that the sheet thickness of either one of the beltline portion 21 and the boundary portion 22 is increased.

Eighth Embodiment

Figure 17:
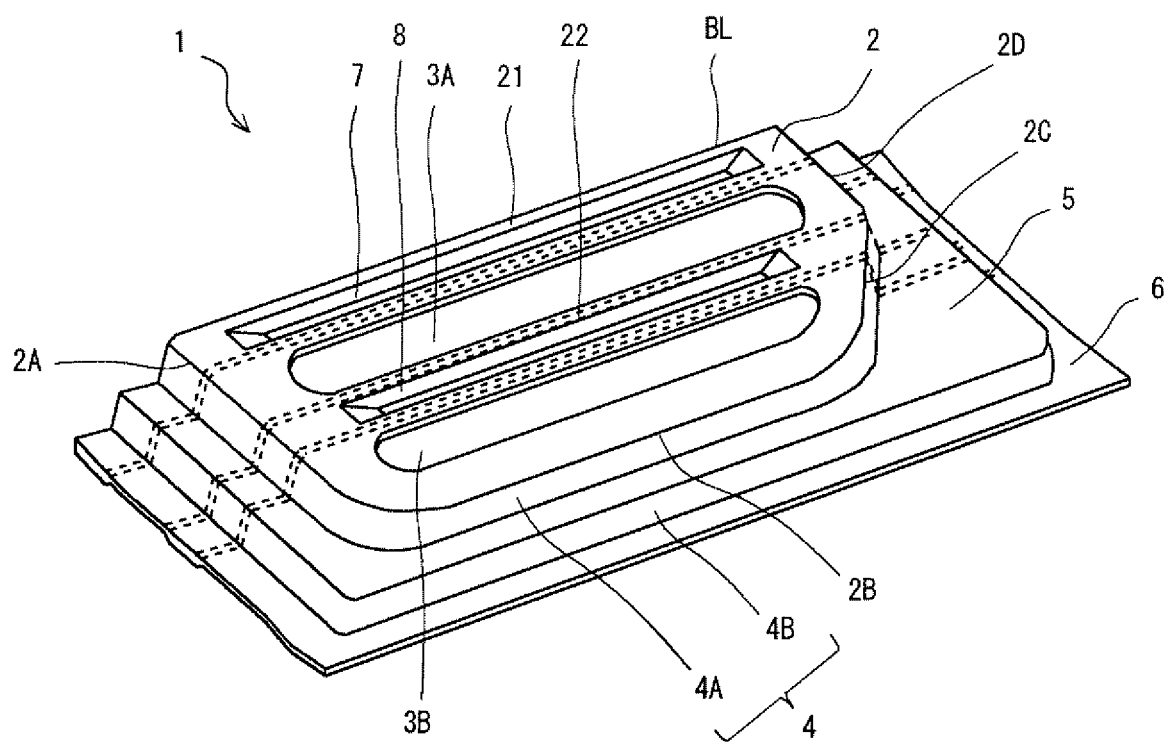
FIG. 17 is a perspective view of a door inner panel of an eighth embodiment.

FIG. 17 is a perspective view of a door inner panel of an eighth embodiment. The door inner panel 1 of the eighth embodiment shown in FIG. 17 is a modification of the door inner panel 1 of the seventh embodiment shown in FIG. 15 modified according to the fourth embodiment.

Referring to FIG. 17, in the door inner panel 1 of the eighth embodiment, a recessed portion 8 is provided in the boundary portion 22 of the top panel portion 2, as in the door inner panel 1 of the fourth embodiment, along the boundary portion 22. Since the recessed portion 8 is provided in the boundary portion 22 having a large sheet thickness, the strength of the boundary portion 21 is further increased. As a result, the boundary portion 22 also plays a role of a door impact beam. The boundary portion 22 may be provided with a protruded portion in place of the recessed portion 8, or both of the recessed portion 8 and the protruded portion.

The door inner panel 1 of the eighth embodiment is produced by using the starting material shown in FIGS. 16A and 16B as in the seventh embodiment. The recessed portion 8 is formed by hot stamping.

Ninth Embodiment

Figure 18:
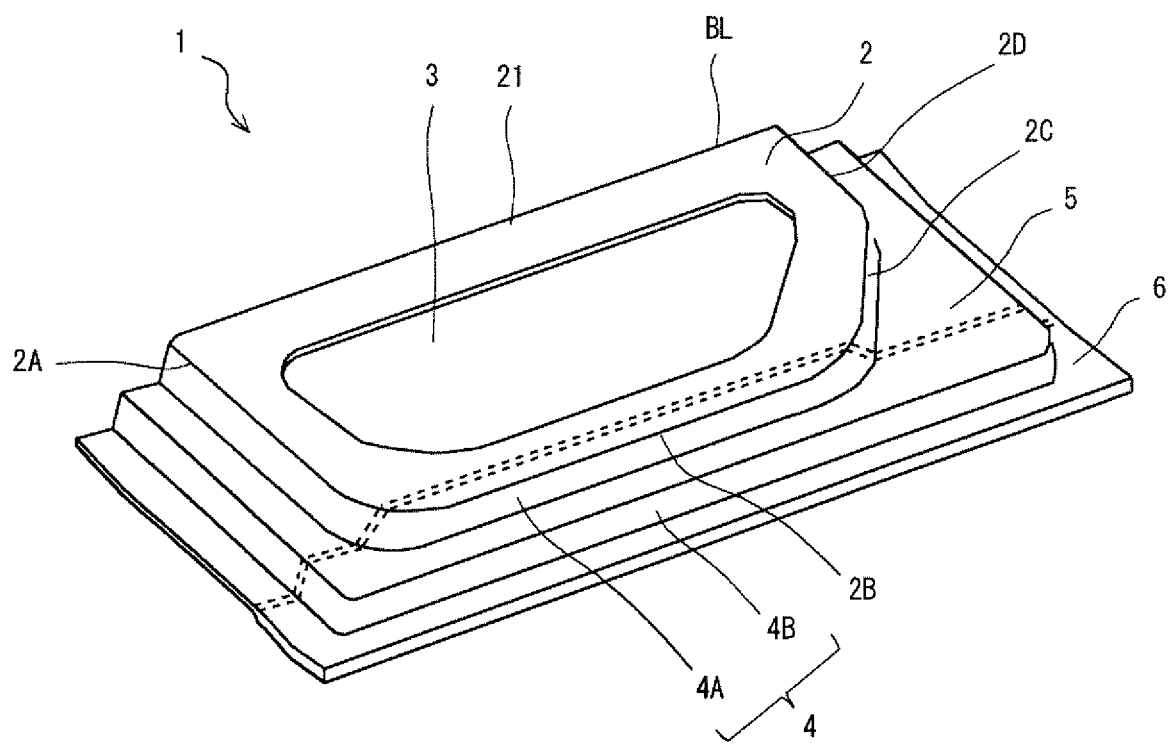
FIG. 18 is a perspective view of a door inner panel of a ninth embodiment.
Figure 19A:
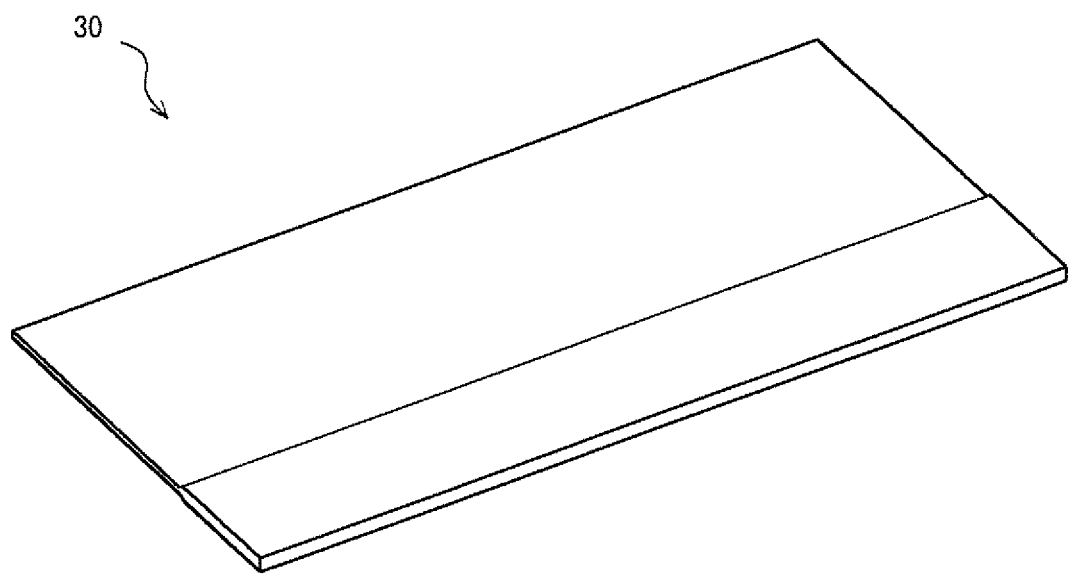
FIG. 19A is a perspective view of the starting material of the door inner panel shown in FIG. 18, showing a state before being punched an opening portion.
Figure 19B:
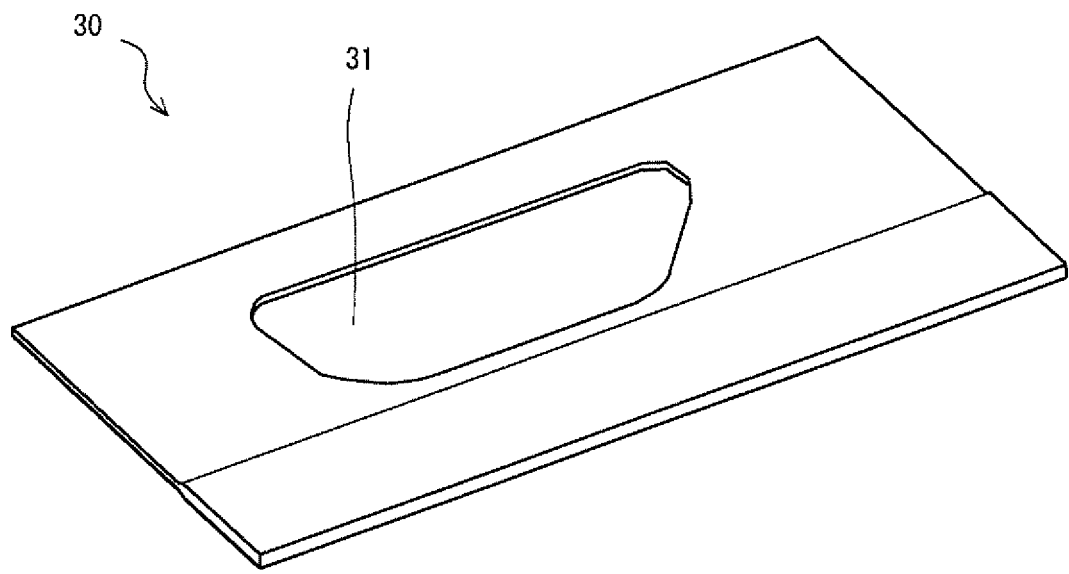
FIG. 19B is a perspective view of the starting material of the door inner panel shown in FIG. 18, showing a state after being punched an opening portion and immediately before being subjected to hot stamping.

FIG. 18 is a perspective view of a door inner panel of a ninth embodiment. FIGS. 19A and 19B are each a perspective view showing the starting material of the door inner panel shown in FIG. 18. Of these figures, FIG. 19A shows a state before being punched an opening portion. FIG. 19B shows a state after being punched the opening portion and immediately before being subjected to hot stamping.

Referring to FIG. 18, in the door inner panel 1 of the ninth embodiment, the sheet thickness of a region of a lower-side vertical wall portion 4 including a lower-side border 2B of the top panel portion 2 is larger than that of a region adjacent to that region. In other words, the sheet thickness of the door inner panel 1 is not constant, but the sheet thickness of the lower-side vertical wall portion 4 is increased. As a result, strength of the lower-side vertical wall portion 4 is increased, and the collision characteristic of the door inner panel is improved. In addition, when there is a region other than the lower-side vertical wall portion 4, in which high strength is not required, it is also expected to reduce the weight of the door inner panel 1 by reducing the sheet thickness of that region. FIG. 18 shows an exemplary case in which the sheet thickness is increased in a lower-side step portion 5 and a lower-side flange portion 6, in addition to the lower-side vertical wall portions 4A and 4B.

The door inner panel 1 of a ninth embodiment is produced by using the starting material shown in FIGS. 19A and 19B. Specifically, first, a TRB 30 having a contour shape corresponding to the contour shape of the door inner panel 1 is prepared. In this TRB 30, the sheet thickness of a region corresponding to a lower-side vertical wall portion 4 of the door inner panel 1 is larger than those of other regions. Next, the TRB 30 is formed with an opening portion 31 corresponding to the opening portion 3 of the top panel portion 2 of the door inner panel 1. By applying the hot stamping described above to the TRB 30 having such opening portion 31, it is possible to form the door inner panel 1 shown in FIG. 18.

Note that the door inner panel 1 of the fifth to eighth embodiment may also be varied such that the sheet thickness of lower-side vertical wall portion 4 is increased according to the ninth embodiment.

Figure 20:
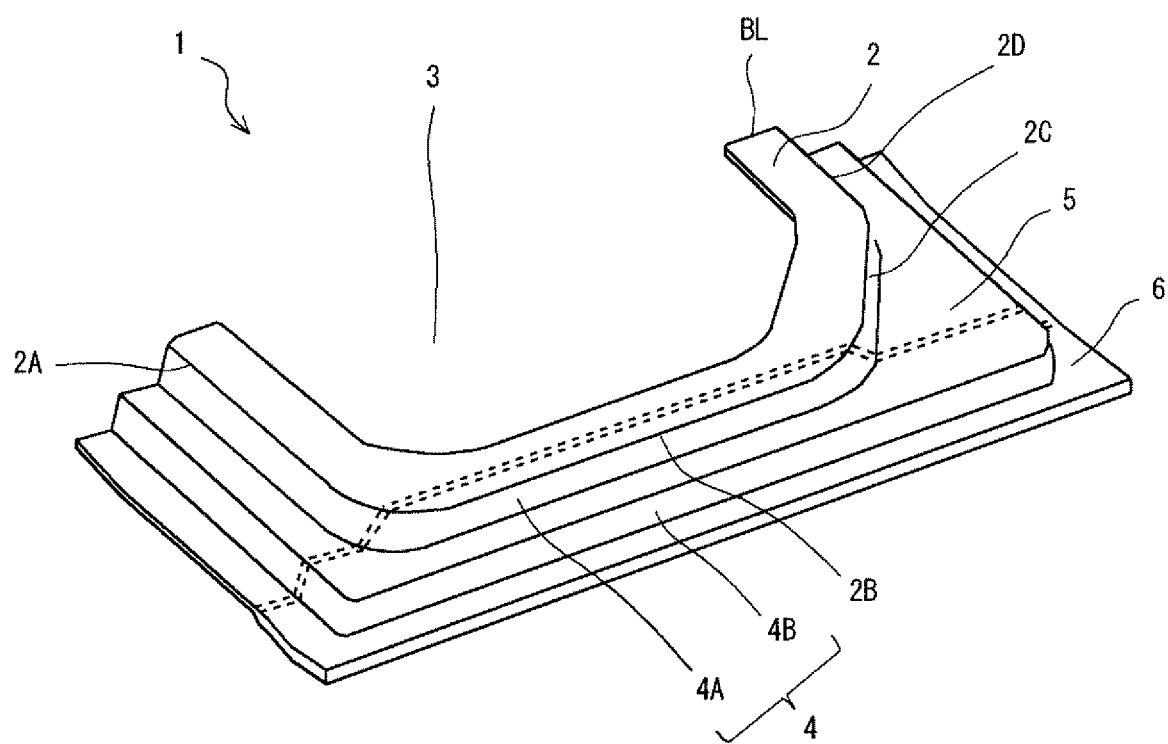
FIG. 20 is a perspective view of a door inner panel different from that of FIG. 18.
Figure 21:
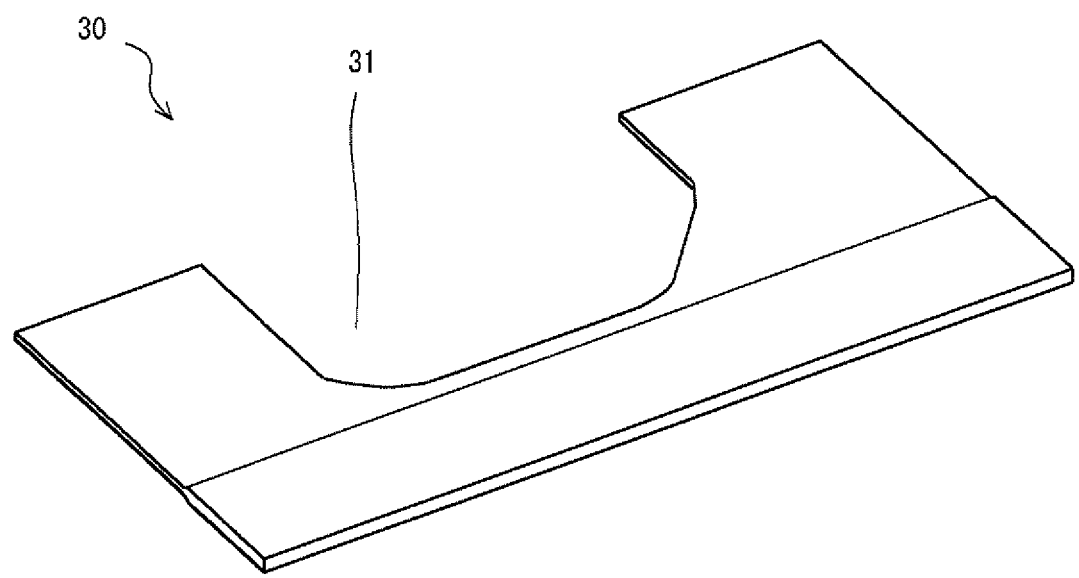
FIG. 21 is a perspective view of the starting material of the door inner panel shown in FIG. 20, showing a state after being punched an opening portion and immediately before being subjected to hot stamping.

FIG. 20 is a perspective view of a door inner panel having an opening portion 3 having a shape different from that of FIG. 18. FIG. 21, which is a perspective view showing the starting material of the door inner panel shown in FIG. 20, shows a state after being punched the opening portion and immediately before being subjected to hot stamping.

In the door inner panel 1 shown in FIG. 20, an opening portion 3 extends over one border of a peripheral edge portion of a top panel portion 2. In other words, the opening portion 3 is provided so that a beltline BL is interrupted. In this case, as shown in FIG. 21, an opening portion 31 corresponding to the opening portion 3 of the top panel portion 2 of the door inner panel 1 is formed in the TRB 30 before the punching processing shown in FIG. 19A. By applying the hot stamping described above to the TRB 30 having such opening portion 31, it is possible to form the door inner panel 1 shown in FIG. 20.

Tenth Embodiment

Figure 22:
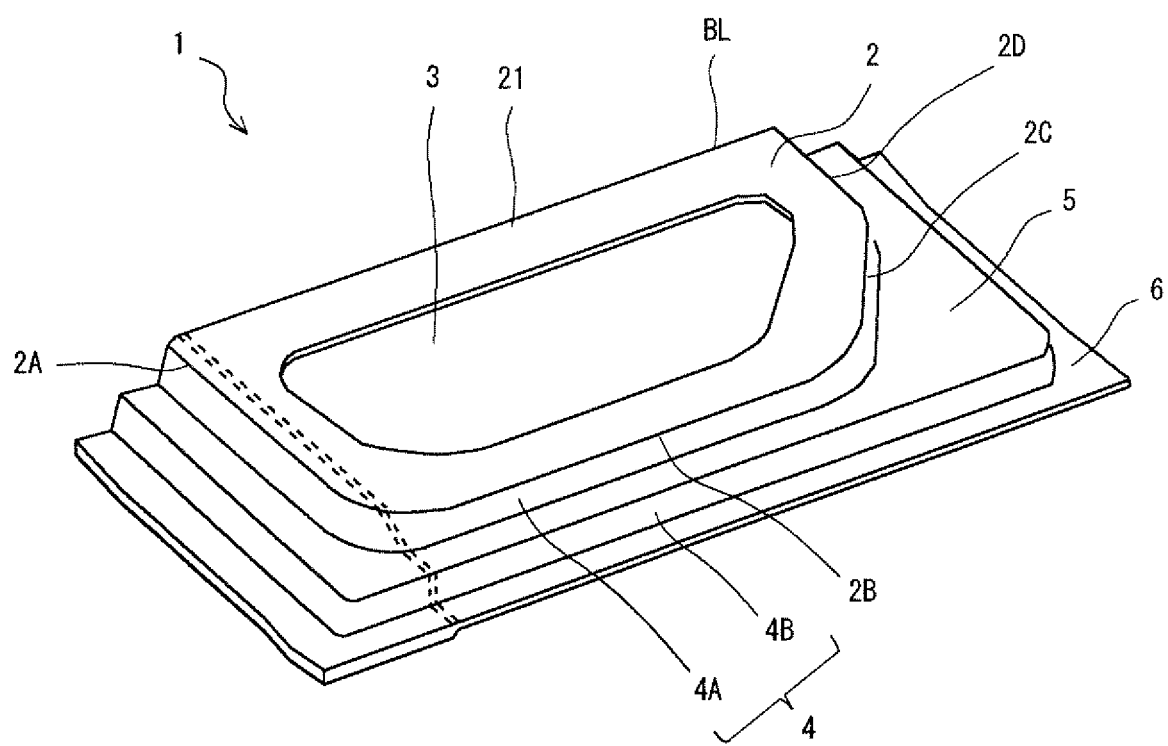
FIG. 22 is a perspective view of a door inner panel of a tenth embodiment.
Figure 23A:
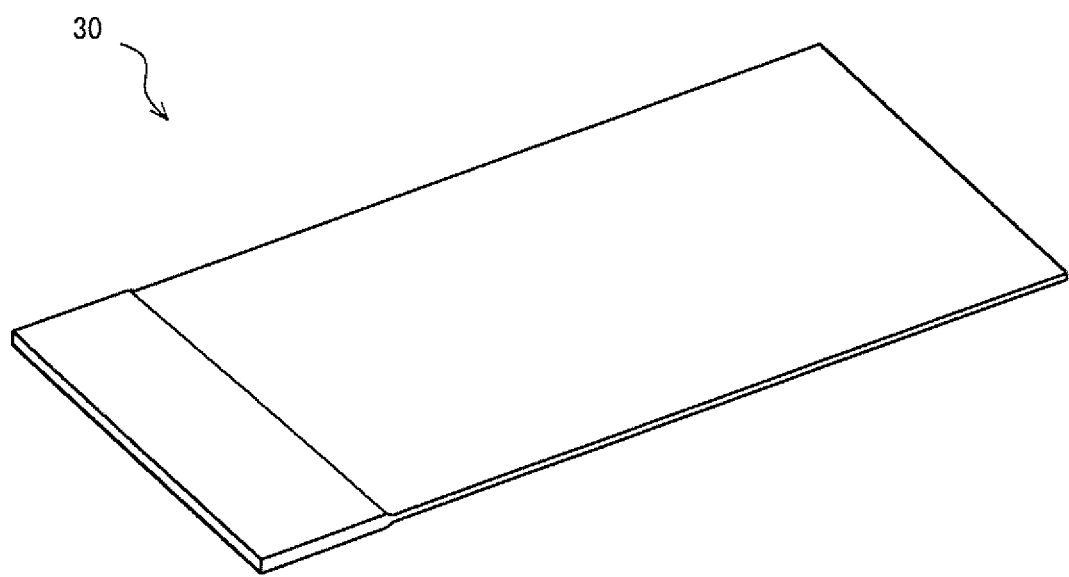
FIG. 23A is a perspective view of a starting material of the door inner panel shown in FIG. 22, showing a state before being punched an opening portion.
Figure 23B:
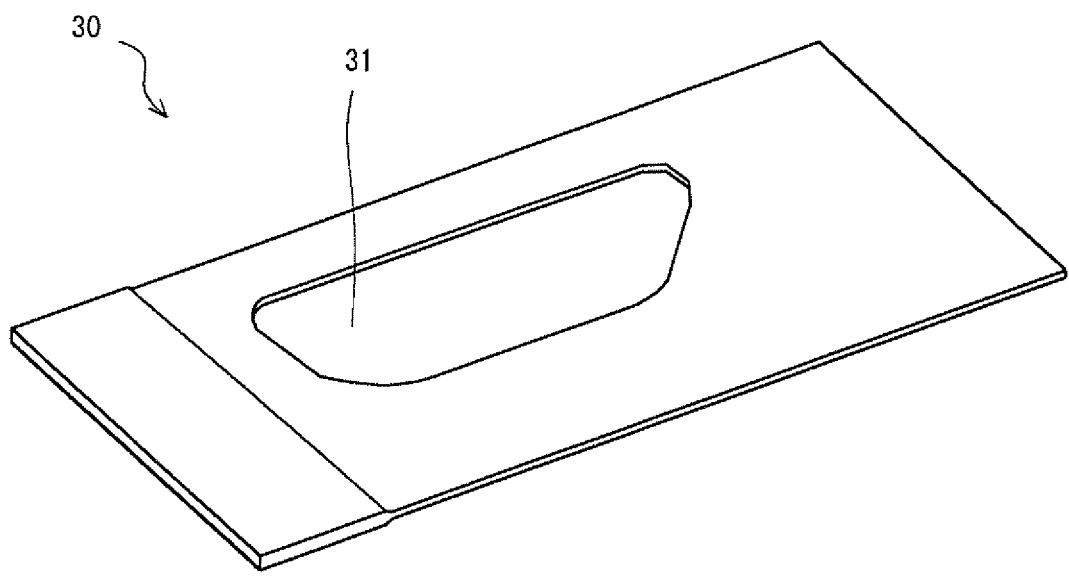
FIG. 23B is a perspective view of the starting material of the door inner panel shown in FIG. 22, showing a state after being punched an opening portion and immediately before being subjected to hot stamping.

FIG. 22 is a perspective view of a door inner panel of a tenth embodiment. FIGS. 23A and 23B are each a perspective view showing a starting material of the door inner panel shown in FIG. 22. Of these figures, FIG. 23A shows a state before being punched an opening portion. FIG. 23B shows a state after being punched the opening portion and immediately before being subjected to hot stamping.

Referring to FIG. 22, in a door inner panel 1 of a tenth embodiment, the sheet thickness of a region of a front-side vertical wall portion 4 (vertical wall portion 4A) including a front-side border 2A of the top panel portion 2 is larger than that of a region adjacent to the region. In other words, the sheet thickness of the door inner panel 1 is not constant, but the sheet thickness of the front-side vertical wall portion 4 is increased. As a result, the strength of the front-side vertical wall portion 4 to which a hinge is attached is increased. In addition, when there is a region other than the front-side vertical wall portion 4, in which high strength is not required, it is expected to reduce the weight of the door inner panel 1 by decreasing the sheet thickness of that region. FIG. 22 shows an exemplary case in which in addition to the front-side vertical wall portions 4A and 4B, the thicknesses of the front-side step portion 5 and the front-side flange portion 6 are also increased.

The door inner panel 1 of a tenth embodiment is produced using the starting material shown in FIGS. 23A and 23B. Specifically, first, as shown in FIG. 23A, a TRB 30 having a contour shape corresponding to the contour shape of the door inner panel 1 is prepared. In this TRB 30, the sheet thickness of a region corresponding to the front-side vertical wall portion 4 of the door inner panel 1 is larger than those of other regions. Next, the TRB 30 is formed with an opening portion 31 corresponding to the opening portion 3 of the top panel portion 2 of the door inner panel 1. By applying the above described hot stamping to the TRB 30 having such opening portion 31, it is possible to form the door inner panel 1 shown in FIG. 22.

Note that using a TWB as the starting material makes it possible to vary the door inner panel 1 of the fifth to ninth embodiments according to the present embodiment such that the sheet thickness of the front-side vertical wall portion 4 is increased. This is because the TWB has a larger degree of freedom for combining steel sheets.

In the above description, a case in which the material of the door inner panel is a steel sheet is described. However, the material of the door inner panel is not limited to a steel sheet, but any metal sheet may be used. The metal sheet may be made of, for example, aluminum, an aluminum alloy, a multi-layer steel sheet, titanium, magnesium, or the like. Further, in the above description, a case in which the panel-shaped formed product is a door inner panel is described. However, the panel-shaped formed product is not limited to the door inner panel. The panel-shaped formed product can be applied to a product requiring excellent impact characteristics. Such products include, for example, vehicles, construction machines, aircraft, etc. in addition to automobiles.

EXAMPLES

Analysis of each press working was conducted supposing press working by use of the hot stamping apparatus 10 shown in FIGS. 9A and 11A, and the hot stamping apparatus 200 shown in FIG. 10. From analysis results, sheet thickness reduction rate and curvature distribution of the door inner panel obtained by each press working were evaluated. Here, as Inventive Example 1 of the present invention, press working by use of the hot stamping apparatus 10 shown in FIG. 9A was supposed. As Inventive Example 2 of the present invention, press working by use of the hot stamping apparatus 10 shown in FIG. 11A was supposed. As Comparative Example, press working by use of the hot stamping apparatus 200 shown in FIG. 10 was supposed.

Analysis Condition

The blank material was a steel sheet containing, by mass %, C: 0.21%, Si: 0.25%, Mn: 1.2%, and B: 0.0014% with the balance being Fe and impurities. The material characteristics after quenching were supposed to be a Vickers hardness of 448, a yield strength of 448 MPa, a tensile strength of 1501 MPa, and a breaking-off elongation of 6.4%. The heating temperature of the blank material was set to 750° C. In consideration of strain rate dependency of mechanical properties, the moving speed of the first and second punches relative to the die was set to equivalent of 40 m/s. The friction coefficient of the blank material against punch, the die, and the blank holder was supposed to be 0.4. Analysis was conducted by using heat-forming coupled analysis by a general purpose FEM (Finite Element Method) software (Trade name: LS-DYNA, supplied by LIVERMORE SOFTWARE TECHNOLOGY Corporation) was used.

Figure 24:
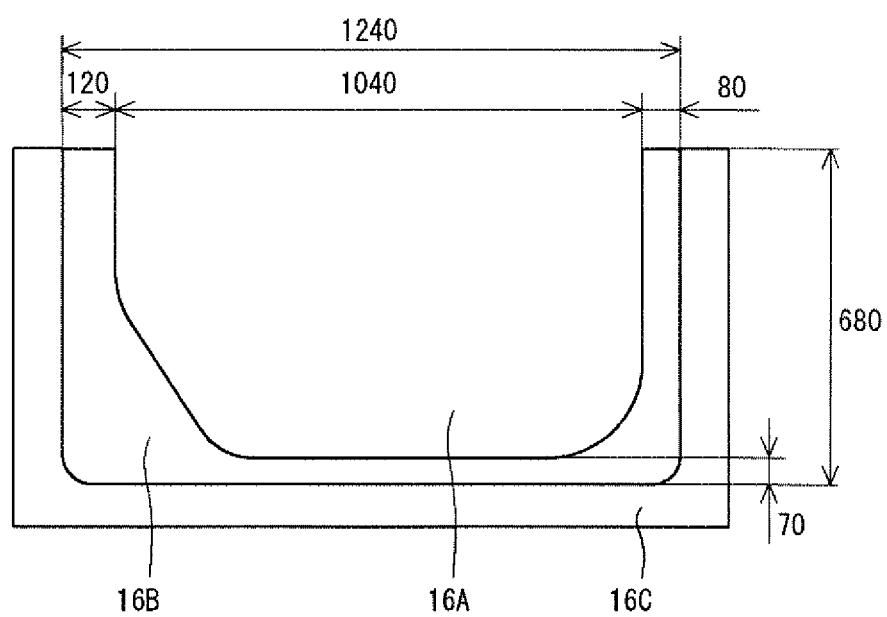
FIG. 24 shows dimensions of a die used in the analysis of the present example.

FIG. 24 shows dimensions of the die used in the analysis of the present examples. The unit of dimensions in FIG. 24 is mm. A depth d1 between a reference surface 16C of the die and a step surface 16B was supposed to be 45 mm. And a depth d2 between the reference surface 16C of the die and a die bottom surface 16A was supposed to be 120 mm.

In Inventive Example 1 of the present invention, arrangement was made such that the first punch and the second punch came into contact with the blank material at the same time. In other words, in Inventive Example 1 of the present invention, when pushing in by the second punch 13 was completed as shown in FIG. 9B, the front end surface 12A of the first punch 12 was located at the same height as the front end surface 13A of the second punch 13. In Inventive Example 2 of the present invention, the front end surface of the first punch was located lower than the front end surface of the second punch. In other words, in Inventive Example 2 of the present invention, when pushing in by the second punch 13 was completed as shown in FIG. 11B, the front end surface 12A of the first punch 12 was set to be located 40 mm lower than the front end surface 13A of the second punch 13. In Comparative Example, a punch which was integrated without being separated was used. In other words, the step portion and the top panel portion of the door inner panel were formed by a single punch as shown in FIG. 10. Moreover, in both Inventive Examples 1 and 2 of the present invention, it was arranged such that the blank material was held by the die and the blank holder before the first and second punches pushed in the blank material.

Evaluation Method

Sheet thickness reduction rates of the door inner panel and curvature distribution of the surface thereof, which were obtained by the analysis of each press forming, were investigated. The sheet thickness reduction rate was calculated using the following Formula (1).

(Sheet thickness reduction rate [%])=((sheet thickness before press forming)−(sheet thickness after press forming))/(sheet thickness before press forming)×100     (1)

The curvature was calculated using the following Formula (2).

(Curvature [1/$m$])=(1/(radius of curvature))     (2)

Here, a radius of curvature of the surface of the door inner panel was calculated, at each position, in each of a plurality of cross sections perpendicular to the surface of the door inner panel, and a minimum value thereof was adopted for the radius of curvature of Formula (2). The curvature was determined to be a positive value when the material of each position was deformed in such a way to be convex to the back surface side, and a negative value when it was deformed in such a way to be convex to the font surface side. Note that the curvature was evaluated when the first punch reached a position at a distance of 1 mm from its bottom dead center. When the sheet thickness reduction rate is not less than 20.0%, it was judged that a crack occurred in the door inner panel. When the absolute value of the curvature was not less than 0.01, it was judged that a wrinkle occurred in the door inner panel.

Analysis Result

Figure 25A:
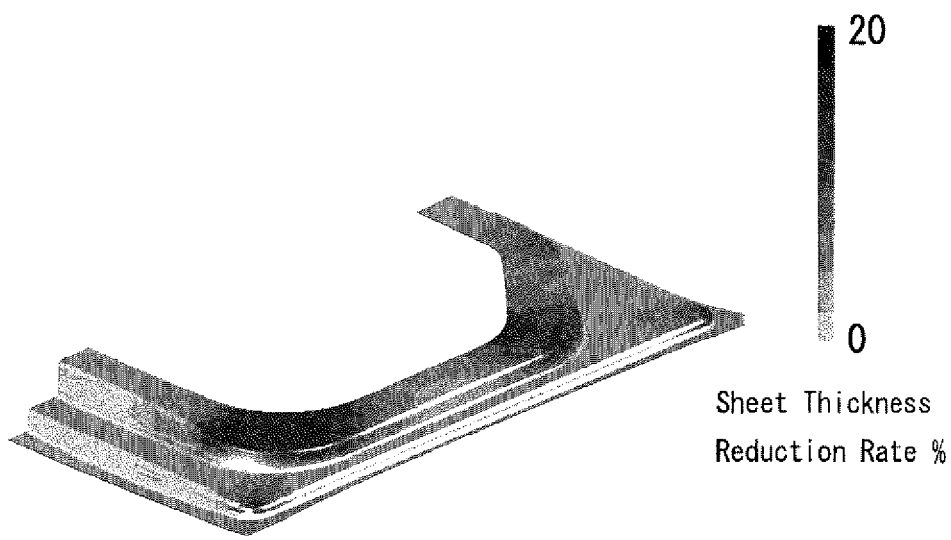
FIG. 25A shows a sheet thickness reduction rate of a door inner panel of Inventive Example 1.
Figure 25B:
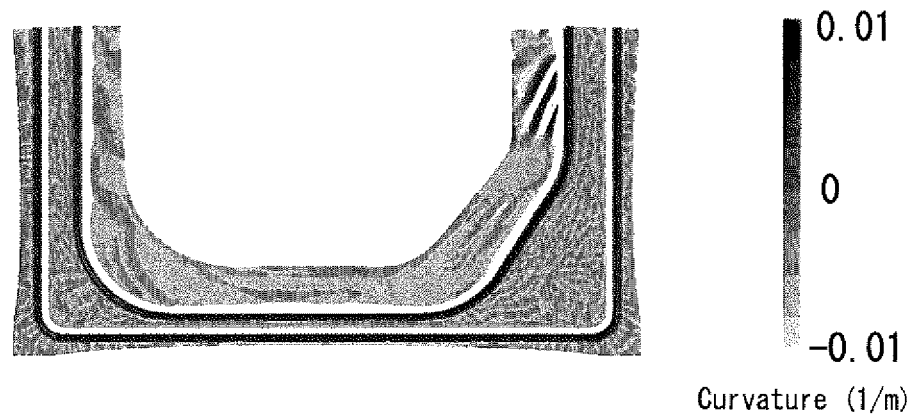
FIG. 25B shows curvature distribution of the door inner panel of Inventive Example 1.

FIGS. 25A and 25B show analysis results of Inventive Example 1 of the present invention. FIG. 25A shows the sheet thickness reduction rate of the door inner panel of Inventive Example 1 of the present invention. FIG. 25B shows the curvature distribution of the door inner panel of Inventive Example 1 of the present invention. Referring to FIG. 25A, a maximum value of the sheet thickness reduction rate was 16.5% in Inventive Example 1 of the present invention. Therefore, it can be said that no crack occurred in the door inner panel. Referring to FIG. 25B, there was no portion observed in which the absolute value of the curvature was not less than 0.01 in the step portion of the door inner panel in Inventive Example 1 of the present invention. Therefore, it can be said that no wrinkle occurred.

Figure 26A:
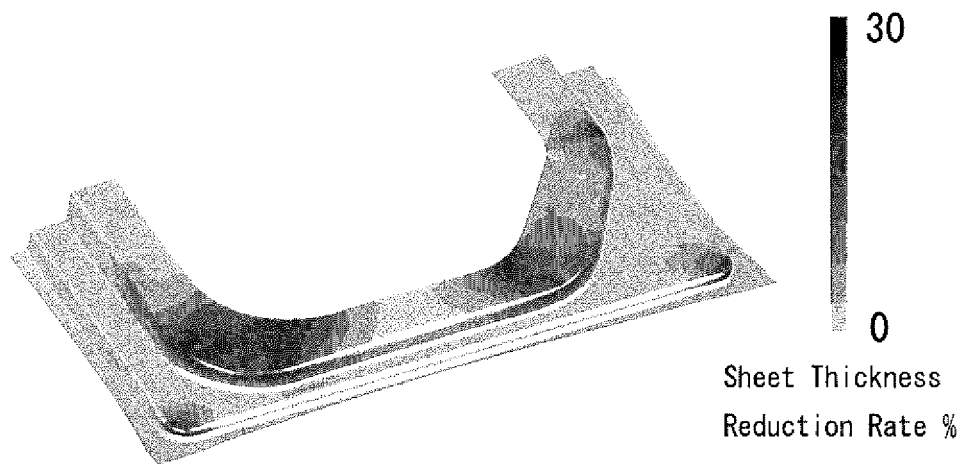
FIG. 26A shows a sheet thickness reduction rate of a door inner panel of Inventive Example 2.
Figure 26B:
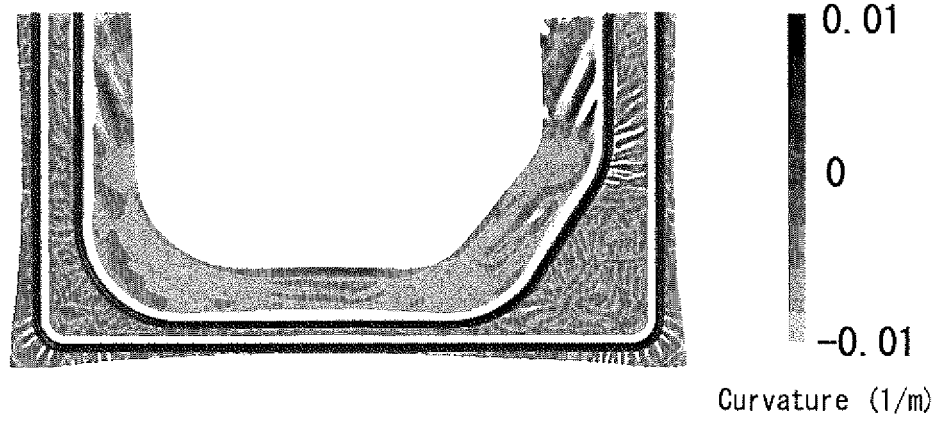
FIG. 26B shows curvature distribution of the door inner panel of Inventive Example 2.

FIGS. 26A and 26B show analysis results of Inventive Example 2 of the present invention. FIG. 26A shows the sheet thickness reduction rate of the door inner panel of Inventive Example 2 of the present invention. FIG. 26B shows the curvature distribution of Inventive Example 2 of the present invention example 2. Referring to FIG. 26A, in Inventive Example 2 of the present invention, the maximum value of the sheet thickness reduction rate was 15.8%. Therefore, it can be said that no crack occurred in the door inner panel. Referring to FIG. 26B, in Inventive Example 2 of the present invention, there was no portion observed in which the absolute value of the curvature was not less than 0.01 in the step portion of the door inner panel. Therefore, it can be said that no wrinkle occurred.

Figure 27A:
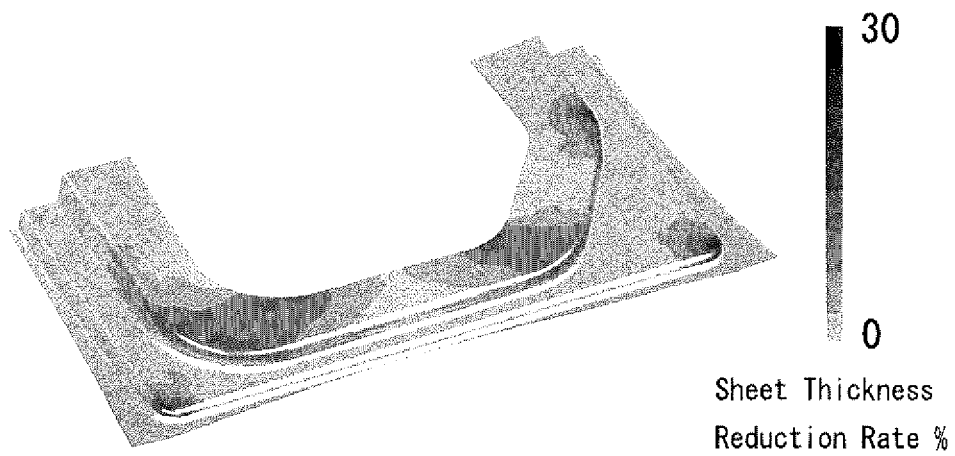
FIG. 27A shows a sheet thickness reduction rate of a door inner panel of Comparative Example.
Figure 27B:
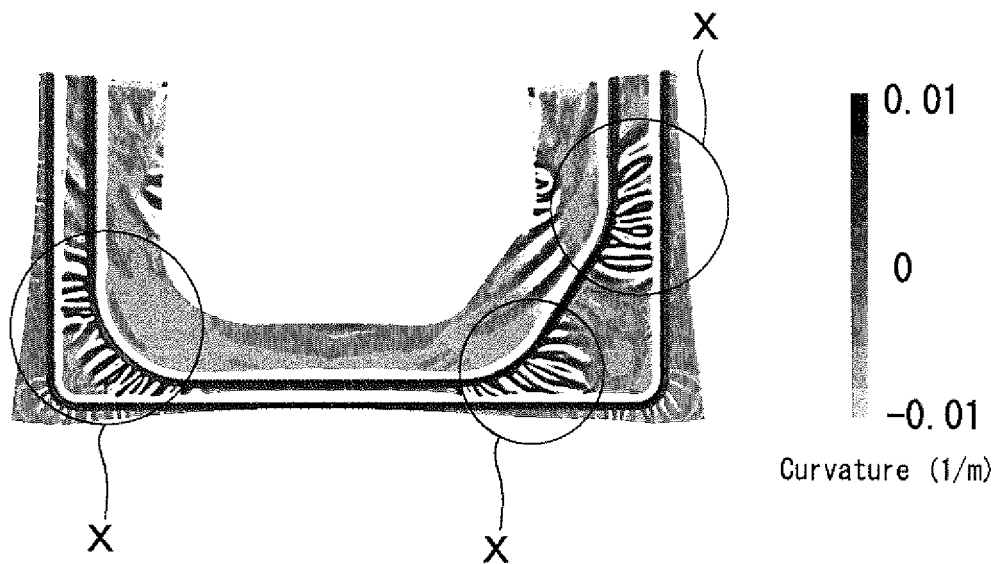
FIG. 27B shows curvature distribution of the door inner panel of Comparative Example.

FIGS. 27A and 27B shows analysis results of Comparative Example. FIG. 27A shows the sheet thickness reduction rate of the door inner panel of Comparative Example. FIG. 27B shows the curvature distribution of the door inner panel of Comparative Example. Referring to FIG. 27A, in Comparative Example, the maximum value of the sheet thickness reduction rate was 14.0%. Therefore, it can be said that no crack occurred in the door inner panel. Referring to FIG. 27B, in Comparative Example, there was observed a portion in which the absolute value of the curvature was not less than 0.01 in a region indicated by X in FIG. 27B in the step portion of the door inner panel. Therefore, it can be said that wrinkles occurred.

So far the embodiments of the present invention have been described. However, the embodiments described above are merely examples for carrying out the present invention. Accordingly, the present invention will not be limited to the above-described embodiments, but the above-described embodiments can be appropriately altered and carried out within a range not departing from the spirit thereof.

REFERENCE SIGNS LIST

1 Door inner panel (panel-shaped formed product)
2 Top panel portion
21 Beltline portion
22 Boundary portion
3, 3A, 3B, 31, 31A, 31B Opening portion
4, 4A, 4B Vertical wall portion
5 Step portion
6 Flange portion
7, 8 Recessed portion
10 Hot stamping apparatus
12 First punch
13 Second punch
14 Blank holder
15 Die
30 TRB
BL Beltline
S Blank material

The invention claimed is:

1. A panel-shaped formed product made of a steel sheet having a quenched martensitic structure and a tensile strength of not less than 1200 MPa, comprising:
   a polygonal top panel portion,
   an opening portion provided in the top panel portion, and
   a vertical wall portion extending from at least two adjacent borders among borders of the top panel portion, wherein
   at least one pair of each vertical wall portion of pairs of adjacent vertical wall portions among the vertical wall portions has a step portion, and a height of the vertical wall portion with the step portion is 40 mm or more.

2. The panel-shaped formed product according to claim 1, wherein
   the panel-shaped formed product is a door inner panel for an automobile, and does not have the vertical wall portion on a border on a vehicle upper side among borders of the top panel portion.

3. The panel-shaped formed product according to claim 2, wherein
   the opening portion is provided such that a peripheral portion of the top panel portion is left out.

4. The panel-shaped formed product according to claim 3, wherein
   in an edge portion on the vehicle upper side including a border on the vehicle upper side of the top panel portion, at least one of a recessed portion and a protruded portion is provided along the edge portion on the vehicle upper side.

5. The panel-shaped formed product according to claim 3, wherein
   the top panel portion has a boundary portion for dividing the opening portion into a plurality of portions, and at least one of a recessed portion and a protruded portion is provided along the boundary portion.

6. The panel-shaped formed product according to claim 2, wherein
   a sheet thickness of a region of a lower-side vertical wall portion including a border on a lower side of the top panel portion is larger than a sheet thickness of a region adjacent to the afore-mentioned region.

7. The panel-shaped formed product according to claim 2, wherein
   a sheet thickness of a region of a front-side vertical wall portion including a border on a front side of the top panel portion is larger than a sheet thickness of a region adjacent to that region.

8. The panel-shaped formed product according to claim 3, wherein
   a sheet thickness of a region of an edge portion on the vehicle upper side including a border on the vehicle upper side of the top panel portion is larger than a sheet thickness of a region adjacent to the afore-mentioned region.

9. The panel-shaped formed product according to claim 3, wherein
   the top panel portion has a boundary portion that divides the opening portion into a plurality of portions, and a sheet thickness of a region of the boundary portion is larger than a sheet thickness of a region adjacent to the afore-mentioned region.

* * * * *